United States Patent
Kanekawa et al.

(10) Patent No.: US 9,882,522 B2
(45) Date of Patent: Jan. 30, 2018

(54) POWER CONVERSION DEVICE, ELECTRIC POWER STEERING SYSTEM, ELECTRIC VEHICLE, ELECTRONIC CONTROL THROTTLE, AND ELECTRIC BRAKE

(71) Applicant: Hitachi Automotive Systems, Ltd., Hitachinaka-shi, Ibaraki (JP)

(72) Inventors: Nobuyasu Kanekawa, Tokyo (JP); Ryoichi Kobayashi, Ibaraki (JP); Tomonobu Koseki, Ibaraki (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 14/908,832

(22) PCT Filed: May 23, 2014

(86) PCT No.: PCT/JP2014/063632
§ 371 (c)(1),
(2) Date: Jan. 29, 2016

(87) PCT Pub. No.: WO2015/015878
PCT Pub. Date: Feb. 5, 2015

(65) Prior Publication Data
US 2016/0173020 A1    Jun. 16, 2016

(30) Foreign Application Priority Data
Aug. 2, 2013    (JP) .................................. 2013-160929

(51) Int. Cl.
*H02P 27/04*    (2016.01)
*B62D 5/04*    (2006.01)
(Continued)

(52) U.S. Cl.
CPC ............ *H02P 27/04* (2013.01); *B62D 5/0484* (2013.01); *B62D 5/0487* (2013.01);
(Continued)

(58) Field of Classification Search
CPC ............ H02P 27/04; H02P 27/06; H02M 7/48
(Continued)

(56) References Cited

U.S. PATENT DOCUMENTS 5,852,558 A * 12/1998 Julian ................. H02M 7/5387
363/132
7,619,383 B2 * 11/2009 Singhi ....................... H02P 6/34
318/132
(Continued)

FOREIGN PATENT DOCUMENTS

EP    2 112 051 A1    10/2009
JP    10-167085    6/1998
(Continued)

OTHER PUBLICATIONS

PCT International Search Report on application PCT/JP2014/063632 dated Sep. 9, 2014; 2 pages.
(Continued)

*Primary Examiner* — Bentsu Ro
(74) *Attorney, Agent, or Firm* — Foley & Lardner LLP

(57) ABSTRACT

A power conversion device is configured to convert power supplied from a power source into a driving current of a motor. A first semiconductor switching element of the power conversion device is disposed between a phase output of the power conversion device and the power source. A second semiconductor switching element of the power conversion device is disposed between the phase output of the power conversion device and a ground. The power conversion device further includes a first semiconductor switching element group.

17 Claims, 21 Drawing Sheets

(51) Int. Cl.
*H02P 27/06* (2006.01)
*H02M 7/5387* (2007.01)
*H02H 7/122* (2006.01)
*H02P 29/032* (2016.01)
*H02M 1/32* (2007.01)

(52) U.S. Cl.
CPC ........ *H02H 7/1225* (2013.01); *H02M 7/5387* (2013.01); *H02P 27/06* (2013.01); *H02P 29/032* (2016.02); *H02M 2001/325* (2013.01)

(58) Field of Classification Search
USPC ..... 318/400.26, 400.29, 493, 494, 800, 801; 363/106, 107, 109, 123, 131
See application file for complete search history.

(56) References Cited

U.S. PATENT DOCUMENTS

| | | | |
|---|---|---|---|
| 8,860,349 B2* | 10/2014 | Baranyai | B62D 5/0484 318/400.21 |
| 2004/0200663 A1 | 10/2004 | Kifuku et al. | |
| 2009/0267551 A1* | 10/2009 | Shibata | H02P 6/24 318/400.21 |
| 2010/0270958 A1* | 10/2010 | Tsuboi | B62D 5/0463 318/400.26 |
| 2011/0115289 A1 | 5/2011 | Kitamoto | |
| 2013/0076292 A1 | 3/2013 | Okada et al. | |

FOREIGN PATENT DOCUMENTS

| | | |
|---|---|---|
| JP | 2004-312952 A | 11/2004 |
| JP | 2005-280615 A | 10/2005 |
| JP | 2005-287205 A | 10/2005 |
| JP | 2007-099066 A | 4/2007 |
| JP | 2007-295658 A | 11/2007 |
| JP | 2009-274686 A | 11/2009 |
| JP | 2010-254128 A | 11/2010 |
| JP | 2011-109779 A | 6/2011 |
| JP | 2013-074712 A | 4/2013 |

OTHER PUBLICATIONS

Extended European Search Report dated Mar. 2, 2017 as received in corresponding European Application No. 14832702.6.

* cited by examiner

POWER CONVERSION DEVICE, ELECTRIC POWER STEERING SYSTEM, ELECTRIC VEHICLE, ELECTRONIC CONTROL THROTTLE, AND ELECTRIC BRAKE

TECHNICAL FIELD

The present invention relates to a power conversion device that coverts power supplied from a power source, using a semiconductor switching element.

BACKGROUND ART

As automation of control has been developed, a demand has increased for safety and reliability of electronic control devices. In order to secure the safety of the electronic control devices, it is necessary to promptly detect an abnormality and stop operation when the abnormality occurs. A relay is often used in order to separate the device when the abnormality occurs. For example, a relay sometimes interrupts a main power source when an abnormality occurs. In a motor driving device (in particular, an electric power steering system), a relay sometimes interrupts driving current output (phase output) with respect to a motor when an abnormality occurs.

Meanwhile, replacing the above relay with a semiconductor element has been developing high reliability, a long lifetime, miniaturization, high speed protective operation.

PTL 1 below discloses a technique in which, in an electric power steering system, a metal-oxide-semiconductor field-effect transistor (MOSFET) is inserted into phase output of a power converter and the MOSFET is turned off when an abnormality occurs so as to separate a motor and an inverter.

PTL 2 below discloses, in FIG. 4, a technique in which two MOSFETs are disposed between a power source and a power converter so that directions of diodes are opposite to each other (more specifically, a direction in which current passes through the one MOSFET and a direction in which current passes through the other MOSFET are outward each other). In a case where a MOSFET is used as a relay, even when the MOSFET has been turned off, current flows due to a parasitic diode of the MOSFET. In PTL 2, the two MOSFET are connected in series so as to arrange a direction of a parasitic diode in the one MOSFET and a direction of a parasitic diode in the other MOSFET opposite to each other.

PTL 3 below (refer to FIG. 2) discloses a technique in which a relay interrupts a charge pump power source so as to securely interrupt a MOSFET.

Not only securely stopping operation for safety is required when a failure occurs, but also continuing the operation is required while securing the safety. Electric power systems have been applied to large-sized heavier vehicles as performance of the electric power steering systems has been improved. When operation is stopped upon occurrence of a failure, large steering effort using man power is required. Therefore, even when the failure occurs, continuing the operation is required while securing the safety.

PTL 4 below discloses a method in which when an abnormality occurs in one-phase in a three-phase brushless motor to which star connection is performed in an electric power steering system, magnitude and a direction of a driving current in each of the remaining two phases are controlled so as to rotate a magnetic field vector generated inside the motor. Furthermore, PTL 5 below discloses a packaging method in which totally four bridges including a neutral point are modularized.

CITATION LIST

Patent Literature

PTL 1: JP 2009-274686 A
PTL 2: JP 10-167085 A
PTL 3: JP 2011-109779 A
PTL 4: JP 2007-99066 A
PTL 5: JP 2013-74712 A

SUMMARY OF INVENTION

Technical Problem

In the technique described in the above PTL 1, a semiconductor element interrupts the phase output of the power converter so as to separate the motor from the inverter and stop drive to the motor when the abnormality, such as a short fault of the MOSFET included in the inverter, occurs. Therefore, dangerous behavior can be prevented. However, in a case where a phase output line is short-circuited to the ground, further consideration is required.

In a case where the MOSFET is used as a relay, even when the MOSFET has been turned off, current flows due to a parasitic diode. Thus, in PTL 1, in a case where any of phase output lines on the side of the motor of FETs 7 to 9 has been short-circuited to the ground, in the remaining two phases that have not been short-circuited to the ground, a current path (closed circuit) is formed, the current path in which any route of from an FET 4 to the FET 7, from an FET 5 to the FET 8, and from FET 6 to the FET 9, leads to the ground fault point (ground) through a winding of the motor. That is, when the regenerative current flows in the motor through the current path, the motor receives regenerative braking. Thus, steering by man power is considerably prevented. Note that, even in a case where a direction in which the FETs 7 to 9 are inserted in the phase output, is set so as to be inverse, when any of the phase output lines is short-circuited to a power source, needless to say, a similar phenomenon occurs.

In the technique described in the above PTL 2, the same problem occurs when a ground failure similar to the above ground failure, occurs. As described in PTL 3, it may be thought that the mechanical relay interrupts the power source. However, there is still a problem in terms of, for example, high reliability, a long lifetime, miniaturization, and high speed protective operation, due to disposition of the mechanical relay.

In the technique described in the above PTL 5, all phases including the neutral point have been continuously connected to a motor. Thus, there is a problem in terms of separation of the phase in which a failure has occurred upon failure. In a case where an upper arm or a lower arm of the failed phase has a short fault, since total output of the phase has been connected to a power source or ground potential, a range of a magnetic field vector that can be driven is limited. Thus, it is difficult to rotate the magnetic field vector.

In the technique described in the above PTL 4, a relay is used for separating a phase in which a failure has occurred upon failure, and for connecting a neutral point and a drive circuit. Thus, there is a problem in terms of, for example, high reliability, a long lifetime, miniaturization, and high speed protective operation.

The present invention has been made in consideration of the above problems. A first object of the present invention is to provide high reliability, a long lifetime, miniaturization, and high speed protective operation of a unit for separating a phase in which a failure has occurred upon failure and for connecting a drive circuit to a motor terminal to be driven.

For a semiconductor replaced from an unit for separating the phase in which the failure has occurred upon failure and for connecting the drive circuit to the motor terminal to be driven, a second object of the present invention is to provide interruption of output that causes regenerative braking to a motor even when any of phase output lines is short-circuited to the ground or short-circuited to a power source, in addition to a short fault of a MOSFET included in an inverter.

Solution to Problem

In order to achieve the first object of the present invention, in a power conversion device according to the present invention, a semiconductor element is used as an unit that is connected to each phase and a neutral point of a four-phase motor or a three-phase motor and that separates the phase and connects a drive circuit to a motor terminal to be driven.

In order to achieve the second object of the present invention, a semiconductor switching element included in the power conversion device according to the present invention is connected so that a diode connected in parallel with the semiconductor switching element is connected in a direction in which a current path is not formed, between a power source and the ground (namely, at least one diode connected in parallel with a semiconductor switching element is inverse to the others). Furthermore, the diode is connected in a direction in which a current path is formed neither between a winding of a motor and the power source nor between the winding of the motor and the ground.

Advantageous Effects of Invention

The power conversion device according to the present invention, operation can be continued even when a failure occurs. The unit for separating the phase in which a failure has occurred upon failure and for connecting the drive circuit to the motor terminal to be driven, is replaced to the semiconductor element. Therefore, performance can be improved and safety can be also improved with respect to the short fault.

DESCRIPTION OF EMBODIMENTS

Embodiments of the present invention will be described below based on the drawings. Note that, in the following descriptions, in a case where a MOSFET is disposed in each phase in each MOSFET group, the MOSFET will be denoted with a reference sign indicating each phase. In a case where a MOSFET is not disposed in each phase and only one MOSFET is disposed, a reference sign will be omitted.

First Embodiment

Figure 1:
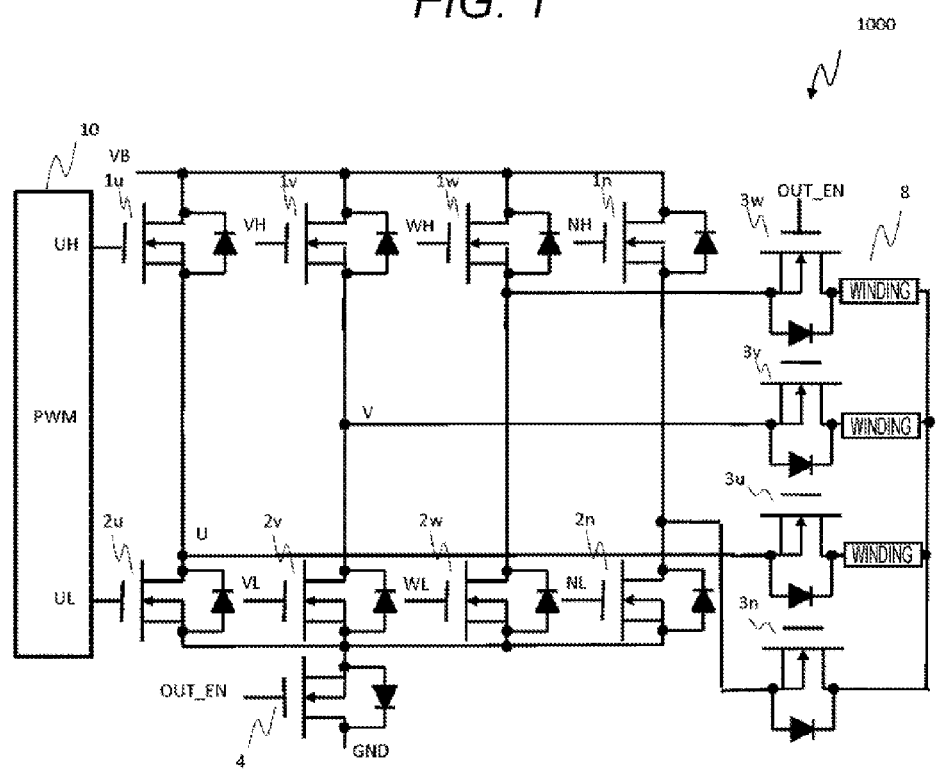
FIG. 1 is a primary circuit diagram according to an embodiment of the present invention.

FIG. 1 is a circuit diagram of a power conversion device 1000 according to a first embodiment of the present invention. The power conversion device 1000 is a device that converts power supplied from a power source into a driving current of a motor 8, and includes a first MOSFET group 1u to 1w, 1n, a second MOSFET group 2u to 2w, 2n, a third MOSFET group 3u to 3w, 3n, and a fourth MOSFET 4 (or a fourth MOSFET group 4u to 4w, 4n).

The first MOSFET group 1u to 1w, 1n is a semiconductor switching element group included in an upper arm of a three-phase (or a four-phase) inverter. The reference signs u to w correspond to U phase to W phase, respectively. The reference sing n corresponds to a neutral point in the three-phase motor or a fourth phase in the four-phase motor. The following descriptions are similar in terms of this. The second MOSFET group 2u to 2w, 2n is a semiconductor switching element group included in a lower arm of the three-phase (or a four-phase).

The third MOSFET group 3u to 3w, 3n is connected between each of pieces of phase output in the power conversion device 1000 and each of pieces of phase output of the motor 8. Each of parasitic diodes connected in parallel with the third MOSFET group 3u to 3w, 3n, is connected in a direction in which current is supplied to the motor 8.

The fourth MOSFET 4 (or the fourth MOSFET group 4u to 4w, 4n) is connected in series with the second MOSFET group 2u to 2w, 2n, between each of the pieces of phase output in the power conversion device 1000 and the ground. A parasitic diode connected in parallel with the fourth MOSFET 4 (or the fourth MOSFET group 4u to 4w, 4n) is connected in a direction in which current flows into the ground.

Note that, in a case where the fourth MOSFET group 4u to 4w is disposed before a junction of each of the pieces of phase output, a MOSFET is required to be disposed for each phase in order to completely interrupt a current path. As illustrated in FIG. 1, in a case where the fourth MOSFET 4 is disposed after each of the pieces of phase output is joined together (on the side of the ground of the junction), disposing the only one fourth MOSFET 4 can completely interrupt the current path leading to the ground. Furthermore, since current returns from the motor 8 without passing through the fourth MOSFET 4, two from the number of MOSFETs through which the current passes can be reduced. On-resistance corresponding to the two can be reduced and loss can be inhibited.

A PWM timer 10 controls the first MOSFET group 1u to 1w, 1n and the second MOSFET group 2u to 2w, 2n. In order to avoid complication of the drawings, only a piece of wiring of a control signal UH from the PWM timer 10 to a gate of the first MOSFET 1u, a piece of wiring of a control signal UL to a gate of the second MOSFET 2u, and a piece of wiring of a control signal OUT_EN to the third MOSFET 3w and the fourth MOSFET 4u, are illustrated. Pieces of wiring of control signals VH, WH, NH to gates in the first MOSFET group 1v to 1w, 1n, pieces of wiring of control signals VL, WL, NL to gates of the second MOSFET group 2v to 2w, 2n, pieces of wiring of control signals OUT_EN to the third MOSFET group 3u to 3v, 3n, and the fourth MOSFET group 4v to 4w, 4n, are omitted. Actually, output from the PWM timer 10 does not directly drive gate terminals of the MOSFET groups. A pre-driver operated by a booster power source typically drives the gate terminals while keeping a sufficient gate-source voltage. Similarly, those are omitted in order to avoid complication of the drawings. Similarly, those are omitted in embodiments to be described below.

With the above circuit configuration illustrated in FIG. 1, in a normal state, turning the third MOSFET group 3u to 3v and the fourth MOSFET 4 on and turning the third MOSFET 3n off perform PWM switching to the first MOSFET group 1u to 1w and the second MOSFET group 2u to 2w. Thus, normal three-phase motor driving operation can be provided. Upon a failure, the third MOSFET group 3u to 3v corresponding to a phase in which the failure has occurred, is turned off so as to interrupt and separate the phase. The third MOSFET 3n is turned on so as to drive a neutral point. Thus, the motor can continue to operate.

Figure 2:
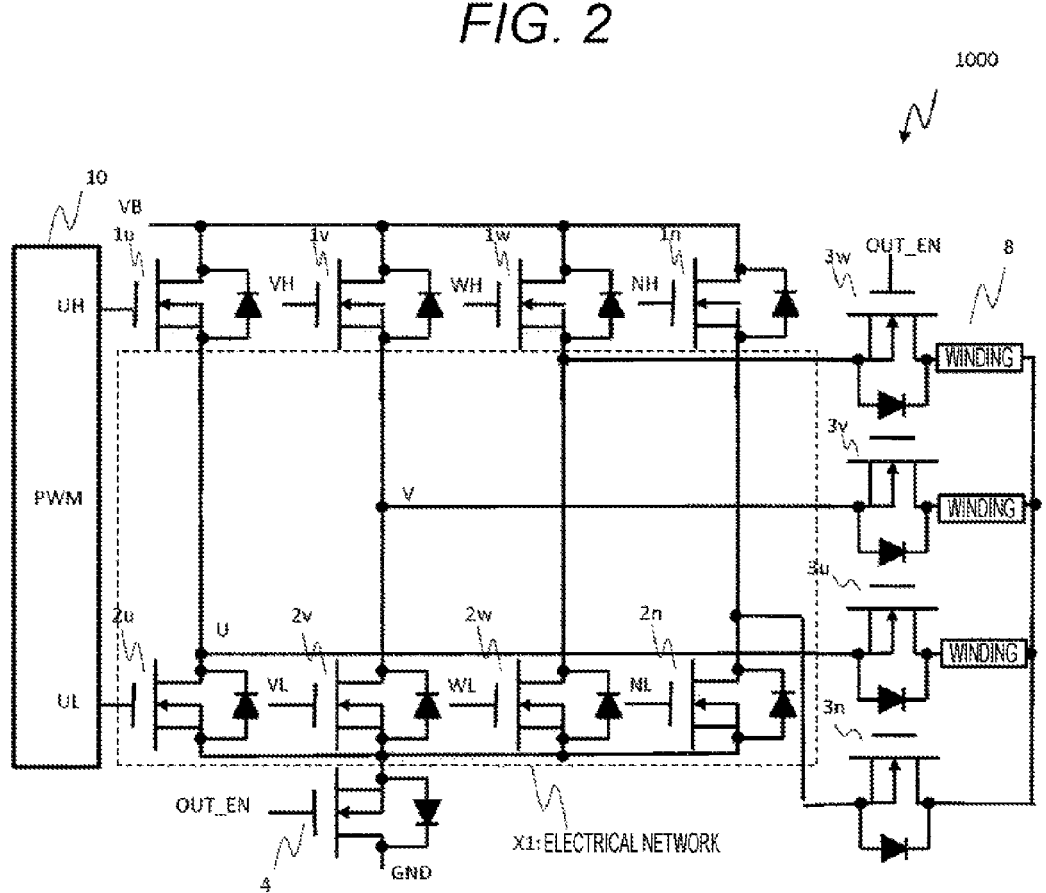
FIG. 2 is a circuit diagram that simplifies a part of a three-phase inverter in the circuit diagram illustrated in FIG. 1 as an electrical network X1 for a description.

FIG. 2 is a circuit diagram that simplifies, as an electrical network X1, a part of the three-phase inverter in the circuit diagram illustrated in FIG. 1 for a description. As illustrated in FIG. 2, directions of parasitic diodes of a first MOSFET group 1u to 1w, 1n, directions of parasitic diodes of a third MOSFET group 3u to 3w, 3n, and directions of parasitic diode of a fourth MOSFET 4 are identical with respect to the electrical network X1. Accordingly, the following effects can be acquired. It can be understood that the same effects can be also acquired in FIG. 1.
(First effect of FIG. 2) In a case where the electrical network X1 is normal, normal operation can be performed.
(Second effect of FIG. 2) Even in a case where a short fault occurs in the electrical network X1 surrounded by the first MOSFET group 1u to 1w, 2n, the third MOSFET group 3u to 3w, 3n, and the fourth MOSFET 4, since there is either a current inlet path or an outlet path (there is neither the current inlet path nor outlet path), a current path between a power source VB and a ground GND is not formed due to the parasitic diodes.
(Third effect of FIG. 2) Even in a case where a short fault occurs in the electrical network X1, a current path between the power source VB and phase output or a current path between the ground GND and the phase output, is not formed.
(Fourth effect of FIG. 2) Even in a case where the phase output is short-circuited to the power source (short circuit to the power source) or to the ground (short circuit to the GND), a closed circuit connecting to the motor 8 through the power source VB or the ground GND, is not formed.

Figure 3:
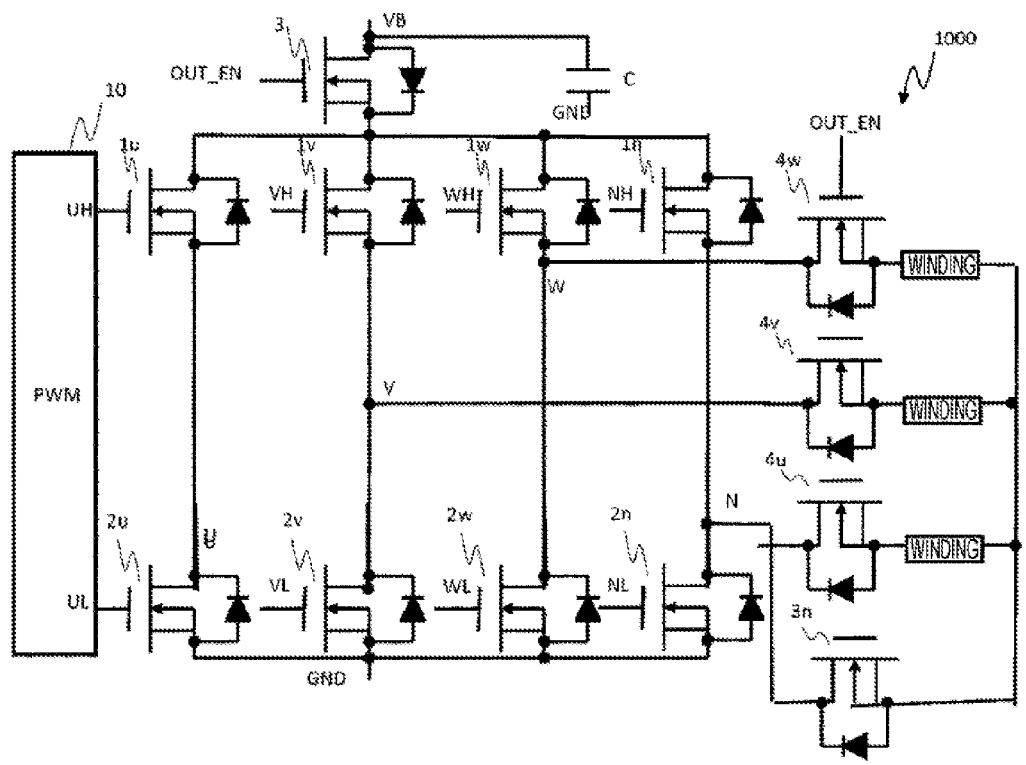
FIG. 3 is a circuit diagram according to a modification in which a direction of a diode disposed outside an electrical network X is inverse to that in FIG. 2.

FIG. 3 is a circuit diagram according to a modification in which directions of parasitic diodes of the MOSFETs disposed outside the electrical network X1 are inverse to those in FIGS. 1 and 2. In FIG. 3, a third MOSFET 3 is disposed between each of pieces of phase output of a power conversion device 1000 and a power source VB. A parasitic diode is connected in a direction in which current flows from the power source VB into a motor 8 (a direction toward the electrical network X1 in FIG. 2, a direction toward X2 in FIG. 5 to be described later). A fourth MOSFET group 4u to 4w, 4n, is disposed between each of the pieces of phase output of the power conversion device 1000 and each of pieces of phase output of the motor 8. Parasitic diodes are connected in a direction in which current flows from the motor 8 to the electrical network X1 or the electrical network X2.

As illustrated in FIG. 3, disposing the third MOSFET 3 on the upstream side of a junction of each of the pieces of phase output causes the one MOSFET to prevent regenerative braking in a case where the phase output is short-circuited to the power source. Disposing the third MOSFET 3 before the junction of each of the pieces of phase output (on the side of the circuit of the junction) requires four MOSFETs (third MOSFET group 3u to 3w, 3n).

As illustrated in FIG. 3, an effect of disposing the one third MOSFET is similar to that of the fourth MOSFET 4 in FIGS. 1 and 2.

With the above circuit configuration illustrated in FIG. 3, in a normal state, turning the third MOSFET 3 and the fourth MOSFET group 4u to 4w on and turning the fourth MOSFET 4n and a fifth MODFET 5n off perform the PWM switching to a first MOSFET group 1u to 1w and a second MOSFET group 2u to 2w. Therefore, normal three-phase driving operation can be provided. In an abnormal state, the fourth MOSFET group 4u to 4w corresponding to a phase in which the abnormality has occurred, is turned off so as to separate the phase. The fourth MOSFET 4n is turned on so as to drive a neutral point. Thus, the motor can continue to operate.

Needless to say, the circuit effect having been described above is similar to those in FIGS. 1 and 2.

Second Embodiment

Figure 4:
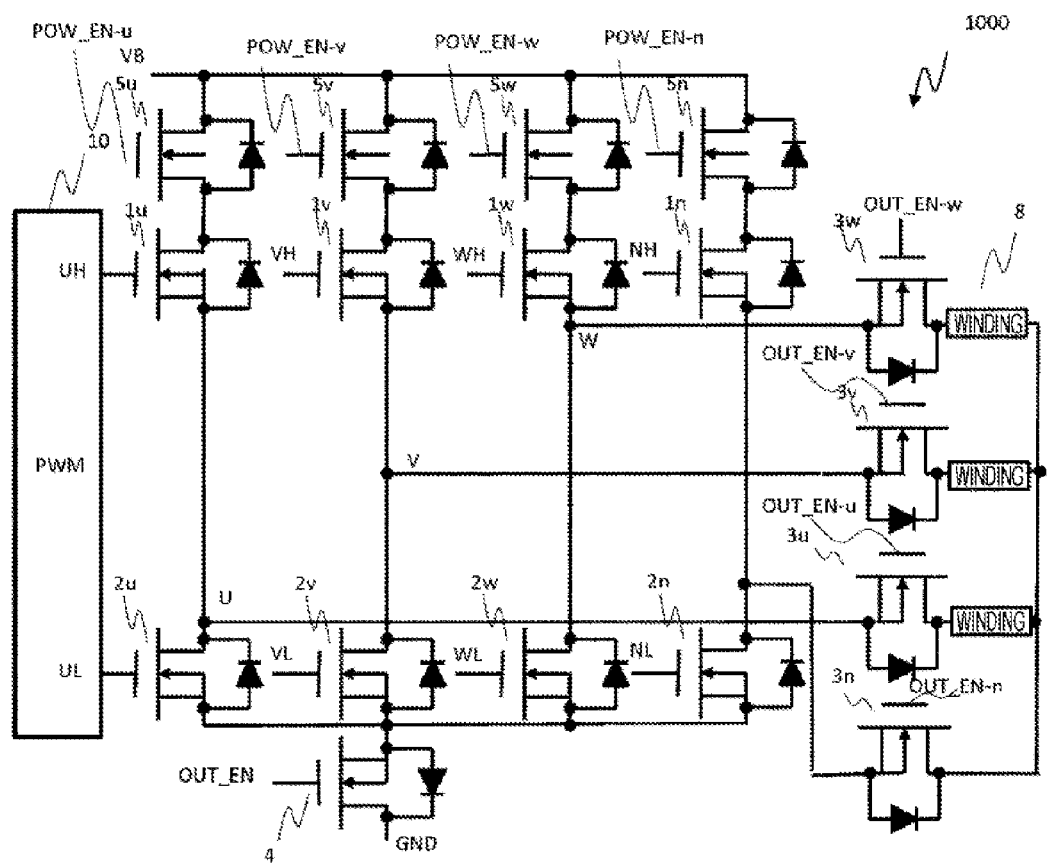
FIG. 4 is a circuit diagram that simplifies a part of the three-phase inverter in the circuit diagram illustrated in FIG. 1 as an electrical network X2 for a description.

In FIG. 4, a fifth MOSFET group 5u to 5w, 5n is connected in series with a first MOSFET group 1u to 1w, 1n in addition to the embodiment in FIG. 1. Here, a direction of the fifth MOSFET group 5u to 5w, 5n is arranged so that directions of diodes connected in parallel are identical to those of the first MOSFET group 1u to 1w, 1n. The fifth MOSFET group 5u to 5w, 5n serves to prevent a power source voltage from being applied to a motor through parasitic diodes connected in parallel with a third MOSFET group 3u to 3w, 3n when a short fault occurs in the first MOSFET group 1u to 1w, 1n. Causing the fifth MOSFET group 5u to 5w, 5n to also serve to perform an entire current interrupting function (interruption of current flowing from a power source VB to a power conversion device 1000) requires no MOSFET for the entire current interrupting function. Thus, the number of MOSFETs can be reduced.

With the above circuit configuration illustrated in FIG. 4, in a normal state, the third MOSFET group 3u to 3v, a fourth MOSFET 4, and the fifth MOSFET group 5u to 5w are turned on and the third MOSFET 3n and the fifth MOSFET group 5n are turned off. Thus, PWM switching is performed to the first MOSFET group 1u to 1w and a second MOSFET group 2u to 2w. Therefore, normal three-phase motor driving operation can be provided. When a failure occurs, the third MOSFET group 3u to 3v and the fifth MOSFET group 5u to 5w corresponding to a phase in which the failure has occurred, are turned off so as to interrupt and separated the phase. The third MOSFET 3n and the fifth MOSFET group 5n are turned on so as to drive a neutral point. Thus, the motor can continue to operate.

An arrangement of each of the above MOSFETs serves to prevent a single failure from forming a current path between each of pieces of phase output of the motor 8 and the power source and a current path between each of the pieces of phase output of the motor 8 and the ground while preventing the single failure from forming a current path between the power source and the ground as described in FIG. 4.

Figure 5:
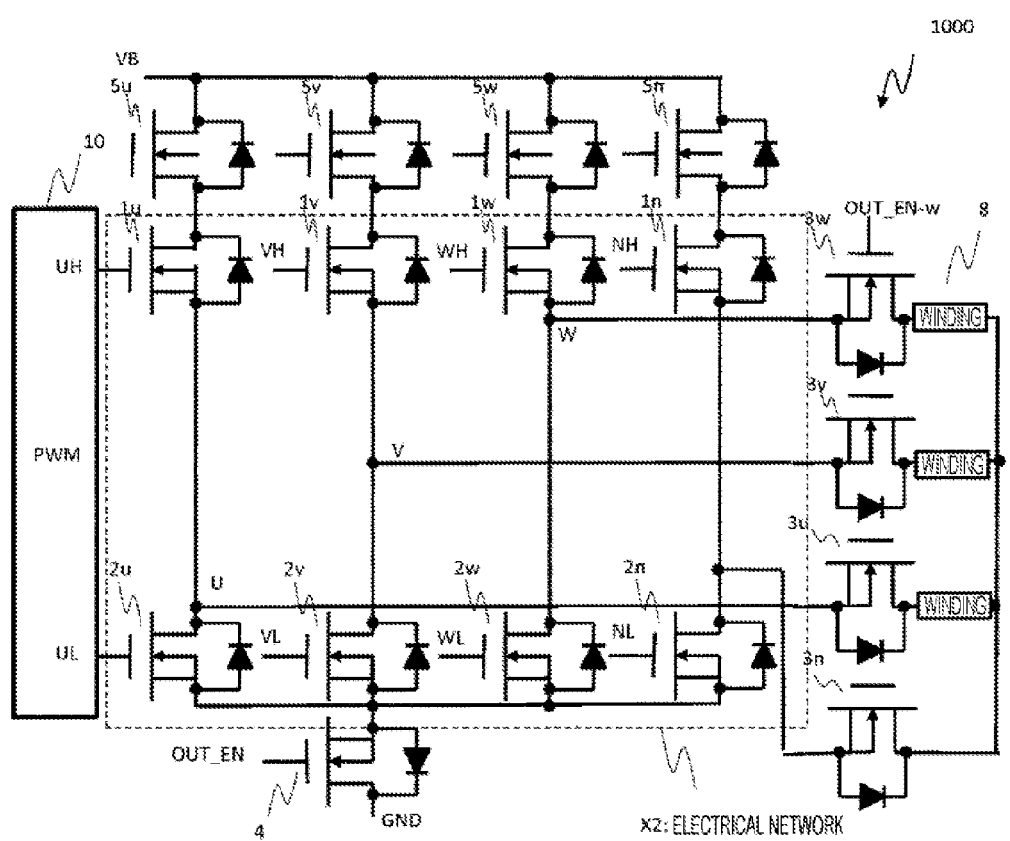
FIG. 5 is a circuit diagram that simplifies a part of the three-phase inverter in the circuit diagram illustrated in FIG. 4 as the electrical network X2 for a description.

A circuit diagram in FIG. 5 further simplifies a part of an inverter in the circuit illustrated in FIG. 4 as the electrical network X2. As illustrated in FIG. 5, directions of parasitic diodes of a third MOSFET group 3u to 3w, 3n, a direction of a parasitic diode of a fourth MOSFET 4, directions of parasitic diodes of a fifth MOSFET group 5u to 5w, 5n are identical with respect to the electrical network X2. Accordingly, the following effects can be acquired.

(First effect of FIG. 4) Effects similar to the first effect, the third effect, and the fourth effect of FIG. 2, can be acquired.

(Second effect of FIG. 5) Even in a case where a short fault occurs in the electrical network X2 surrounded by the third MOSFET group 3u to 3w, 3n, the fourth MOSFET 4, the fifth MOSFET group 5u to 5w, 5n, since there is either a current inlet path or an outlet path (there is neither the current inlet path nor outlet path), a current path between a power source VB and a ground GND is not formed due to the parasitic diodes.

(Third effect of FIG. 5) Even when a short fault occurs in any of a first MOSFET group 1u to 1w, 1n, a second MOSFET group 2u to 2w, 2n, the third MOSFET group 3u to 3w, 3n, the fourth MOSFET 4, and the fifth MOSFET group 5u to 5w, 5n, one piece of phase output can be separated from the power source, the ground, the other pieces of phase output (for having no current path).

Tuning the fifth MOSFET group 5u to 5w, 5n off can deal with a short fault in the first MOSFET group 1u to 1w, 1n. Turning the third MOSFET group 3u to 3w, 3n off can deal with a short fault in the second MOSFET group 2u to 2w, 2n. Turning the second MOSFET group 2u to 2w, 2n off can deal with a short fault in the third MOSFET group 3u to 3w, 3n. Turning the first MOSFET group 1u to 1w, 1n off can deal with a short fault in the fifth MOSFET group 5u to 5w, 5n. A short fault in the fourth MOSFET 4 is not a problem unless a ground fault occurs in phase output (namely, a double failure).

Figure 6:
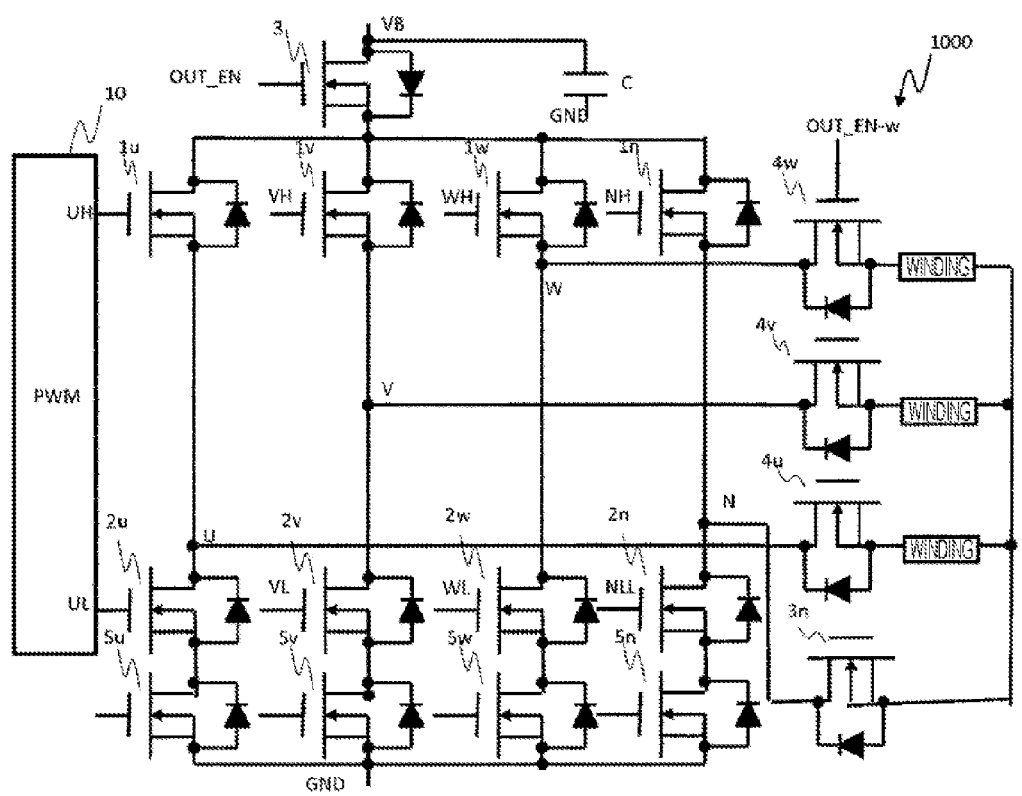
FIG. 6 is a circuit diagram according to a modification in which a direction of a diode disposed outside the electrical network X2 is inverse to that in FIG. 2.

FIG. 6 is a circuit diagram according to a modification in which directions of the parasitic diodes of the MOSFET disposed outside the electrical network X2 illustrated in FIG. 5 are inverse to those in FIGS. 4 and 5. FIG. 6 is an embodiment in which the fifth MOSFET group 5u to 5w, 5n according to the embodiment in FIG. 3 is connected in series with a second MOSFET group 2u to 2w, 2n. Here, a direction of the fifth MOSFET group 5u to 5w, 5n is arranged so that directions of the diodes connected in parallel are identical to those of the second MOSFET group 2u to 2w, 2n.

When a short fault occurs in the second MOSFET group 2u to 2w, 2n, the fifth MOSFET group 5u to 5w, 5n serves to prevent a motor from continuously being connected to the ground through diodes connected in parallel with a fourth MOSFET group 4u to 4w, 4n. Causing the fifth MOSFET group 5u to 5w, 5n to also serve to perform an entire current interrupting function (interruption of current flowing from a power source VB to a power conversion device 1000) requires no MOSFET for the entire current interrupting function. Thus, the number of MOSFETs can be reduced.

With the above circuit configuration illustrated in FIG. 6, in a normal state, a third MOSFET 3, the fourth MOSFET group 4u to 4w, and the fifth MOSFET group 5u to 5w are turned on, and the fourth MOSFET 4n and the fifth MOSFET 5n are turned off. Thus, PWM switching is performed to a first MOSFET group 1u to 1w and the second MOSFET group 2u to 2w. Therefore, normal three-phase driving operation can be provided. In an abnormal state, the fourth MOSFET group 4u to 4w and the fifth MOSFET group 5u to 5w corresponding to a phase in which the abnormality has occurred, are turned off so as to interrupt and separate the phase. The fourth MOSFET 4n and the fifth MOSFET 5n are turned on so as to drive a neutral point. Therefore, the motor can continue to operate.

Needless to say, the above circuit effects are similar to those of FIGS. 4 and 5 having been previously described.

Figure 7:
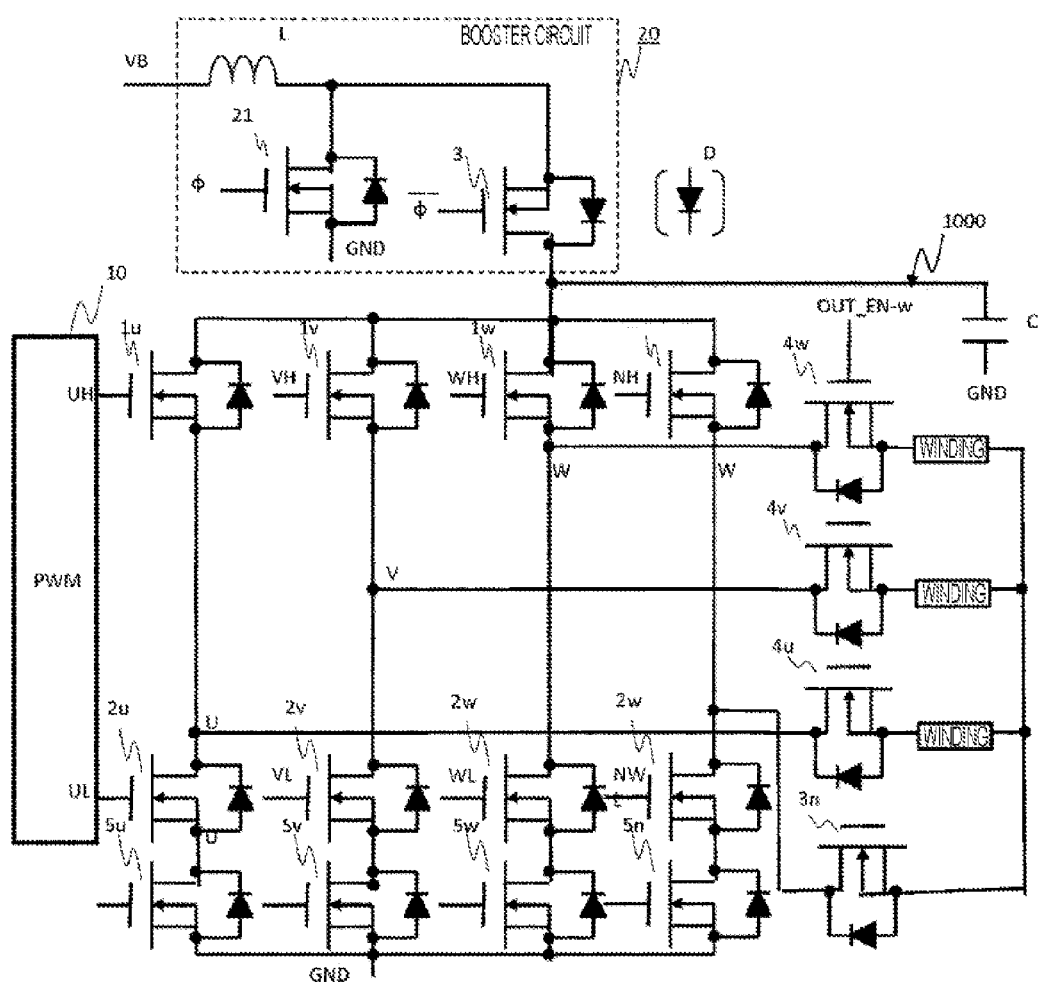
FIG. 7 is a circuit diagram of a circuit configuration in which a third MOSFET 3 in FIG. 6 serves as a configuration element of a booster circuit 20.

FIG. 7 is a circuit diagram of a circuit configuration in which the third MOSFET 3 in FIG. 6 serves as a configuration element of a booster circuit 20. Note that, as illustrated in FIG. 7, a diode D can be used instead of the third MOSFET 3.

First, operation of the booster circuit 20 will be described. When a MOSFET 21 is turned on, current flows through a coil L. When the MOSFET 21 is turned off, a voltage of v=L·di/dt is added to a VB so that a voltage higher than the VB is generated at a drain terminal. In this case, the voltage generated at the drain terminal of the MOSFET 21, is charged in a capacitor C through a parasitic diode of the third MOSFET 3 or the diode D. As described above, turning the MOSFET 21 on and off is repeated so that a voltage higher than the VB is charged in the capacitor C. Furthermore, when the MOSFET 21 is turned off, the third MOSFET 3 is turned on so that forward voltage effect can be reduced. Therefore, conversion efficiency can be increased.

Even in a case where phase output is short-circuited to the power source or the ground, when the third MOSFET 3 has been off as in FIG. 4, a closed circuit that connects with a motor 8 through a power source VB or a ground GND, is not formed.

Figure 8:
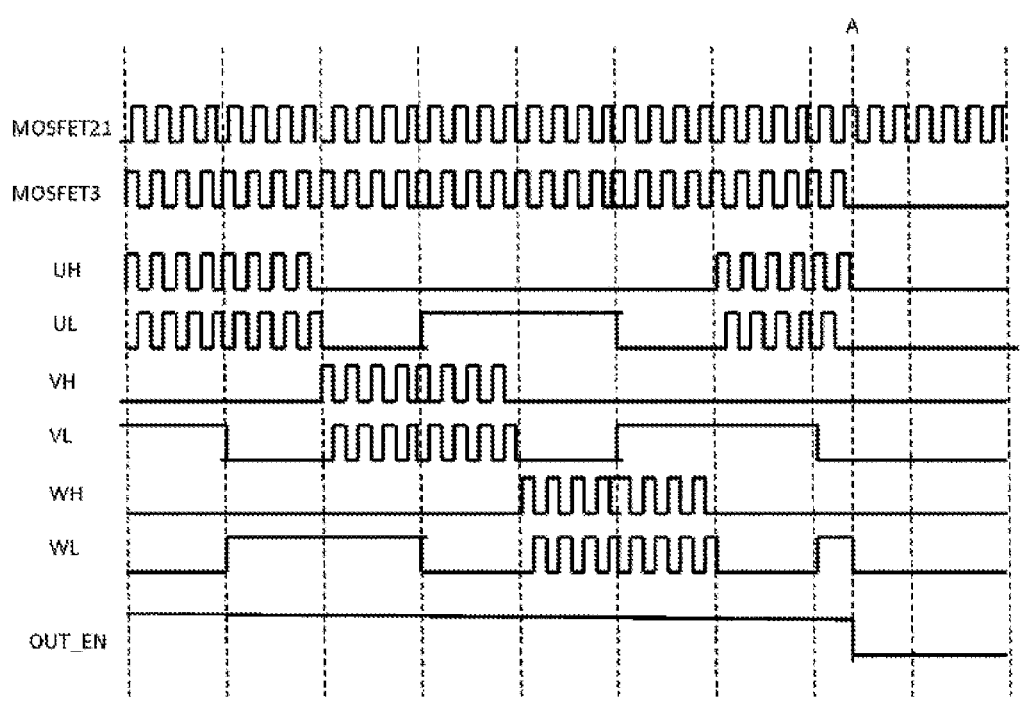
FIG. 8 is a timing diagram for describing operation of the circuit illustrated in FIG. 7.

FIG. 8 is a timing diagram for describing operation of the circuit illustrated in FIG. 7. In FIG. 8, it is assumed that an abnormality, such as a short circuit to the power or the ground, occurs at time A, and operation is performed so as to prevent the motor 8 from receiving regenerative braking after time A.

Before time A, turning the MOSFET 21 and the MOSFET 3 on and off is repeated so as to boost the power source VB and store an electric charge in the capacitor C. After time A when the abnormality has occurred, operation of the MOSFET 21 preferably continues and the MOSFET 3 is preferably turned off.

The reason why turning the MOSFET 3 off is preferable is because, in a case where a short circuit failure to the power source occurs in phase output, when a regenerative voltage due to the motor 8 exceeds a voltage generated by the MOSFET 21 and the coil L, current flows to the side of the VB through the MOSFET 3. As a result, the motor 8 can be prevented from receiving the regenerative braking. The reason why continuing the operation of the MOSFET 21 is preferable is because continuing to boost a voltage of the capacitor C causes a regenerative current from the motor 8 to flow into the capacitor C. As a result, the motor 8 can be prevented from receiving the regenerative braking. Note that, in this case, even when the MOSFET 3 has been turned off, a booster voltage can continue to be applied to the capacitor C through the diode connected in parallel with the MOSFET 3.

Needless to say, drive of each phase has been stopped and an OUT_EN has been turned off after time A as illustrated in FIG. 8.

A power conversion device 1000 or a case of a control device is sometimes connected to the ground. Thus, when a failure occurs, short-circuiting a circuit to the ground is more likely to occur than short-circuiting the circuit to the power source. Therefore, when FIGS. 4 and 5 are compared with FIGS. 6 and 7, the circuit in FIG. 4 and the circuit in FIG. 5 each in which the fifth MOSFET group 5u to 5w, 5n can interrupt the current at a place closest to the VB, have highly safety. Meanwhile, in a case where the power conversion device 1000 or the case of the control device is connected to the VB, the circuit in FIG. 6 and the circuit in FIG. 7 each have highly safety.

Fourth Embodiment

Figure 9:
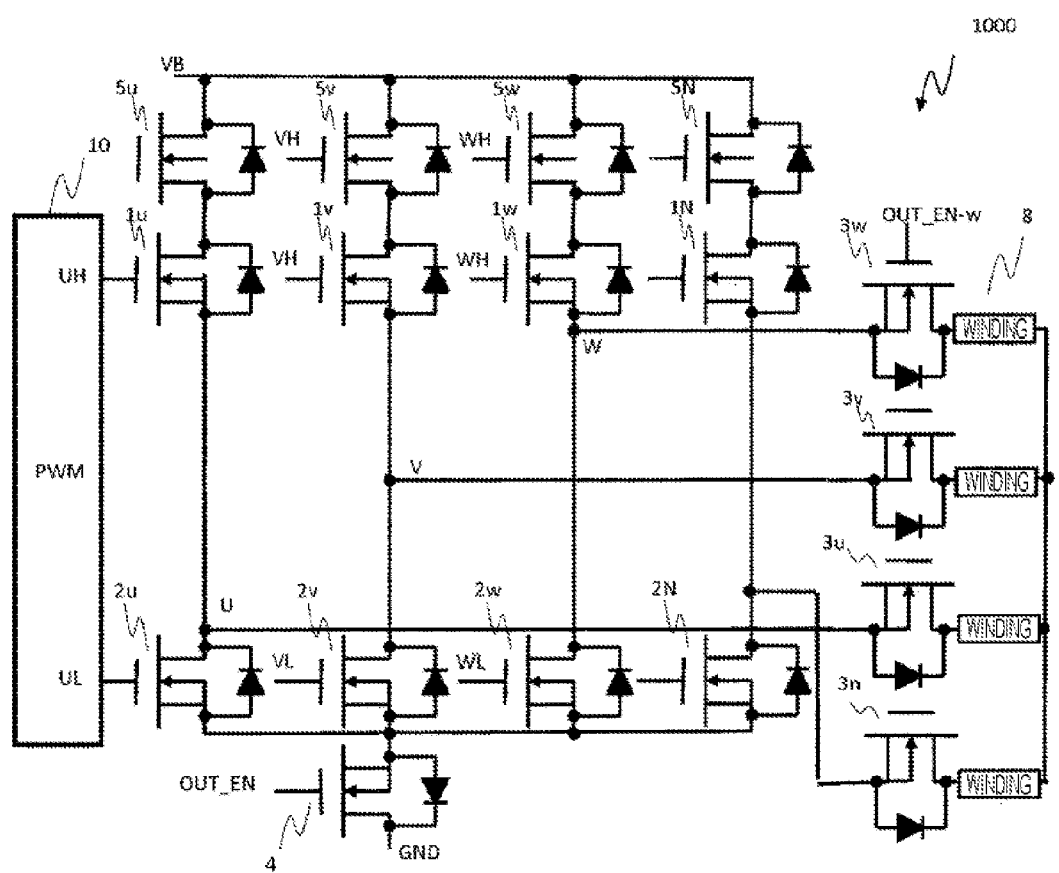
FIG. 9 is a circuit diagram for driving a four-phase motor according to an embodiment.

The embodiments in which a neutral point drive function is added in addition to the three-phase inverter, have been described. As illustrated in FIG. 9, a four-phase motor can be driven. In this case, when a failure occurs, a phase in which the failure has occurred is stopped. A third MOSFET group 3u to 3v, 3n, a fourth MOSFET 4, and a fifth MOSFET group 5u to 5w, 5n are turned off so as to separate the phase. The remaining three phases are driven so that the motor can continue to operate.

Fifth Embodiment

Figure 10:
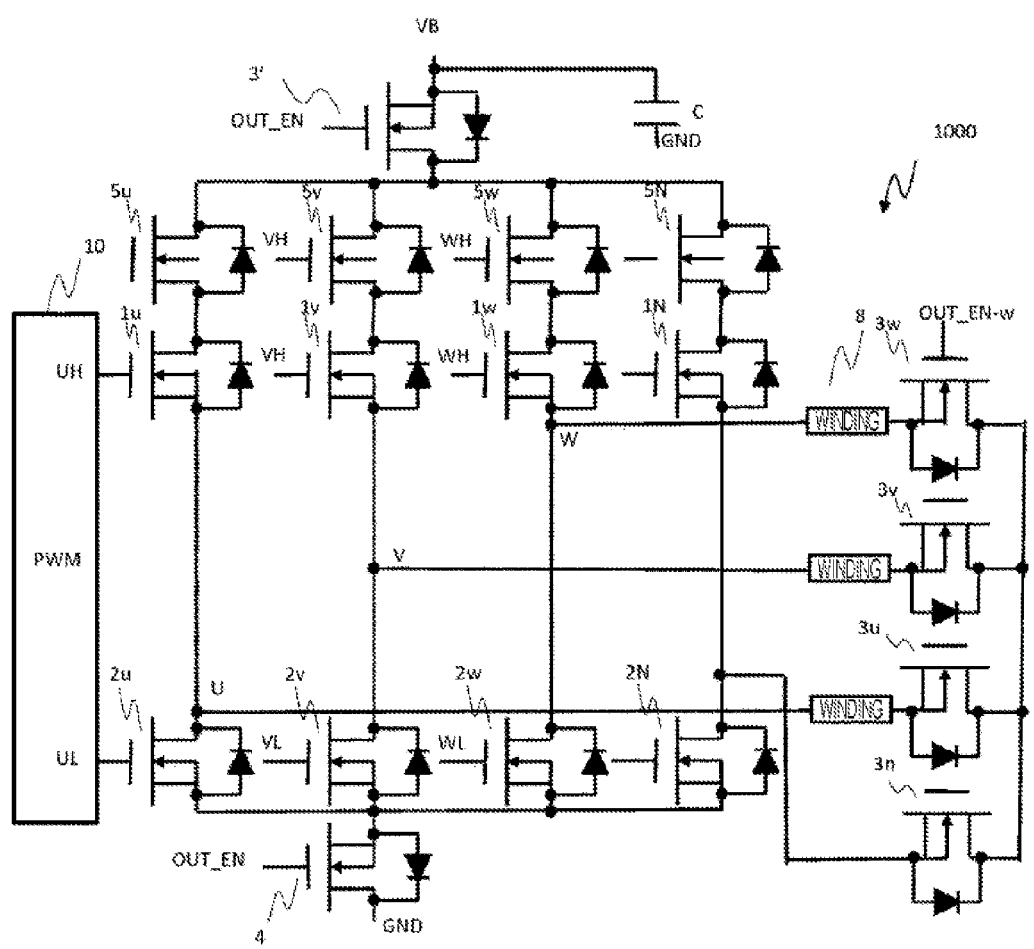
FIG. 10 is a circuit diagram in which a semiconductor relay is inserted in a neutral point, according to an embodiment.
Figure 11:
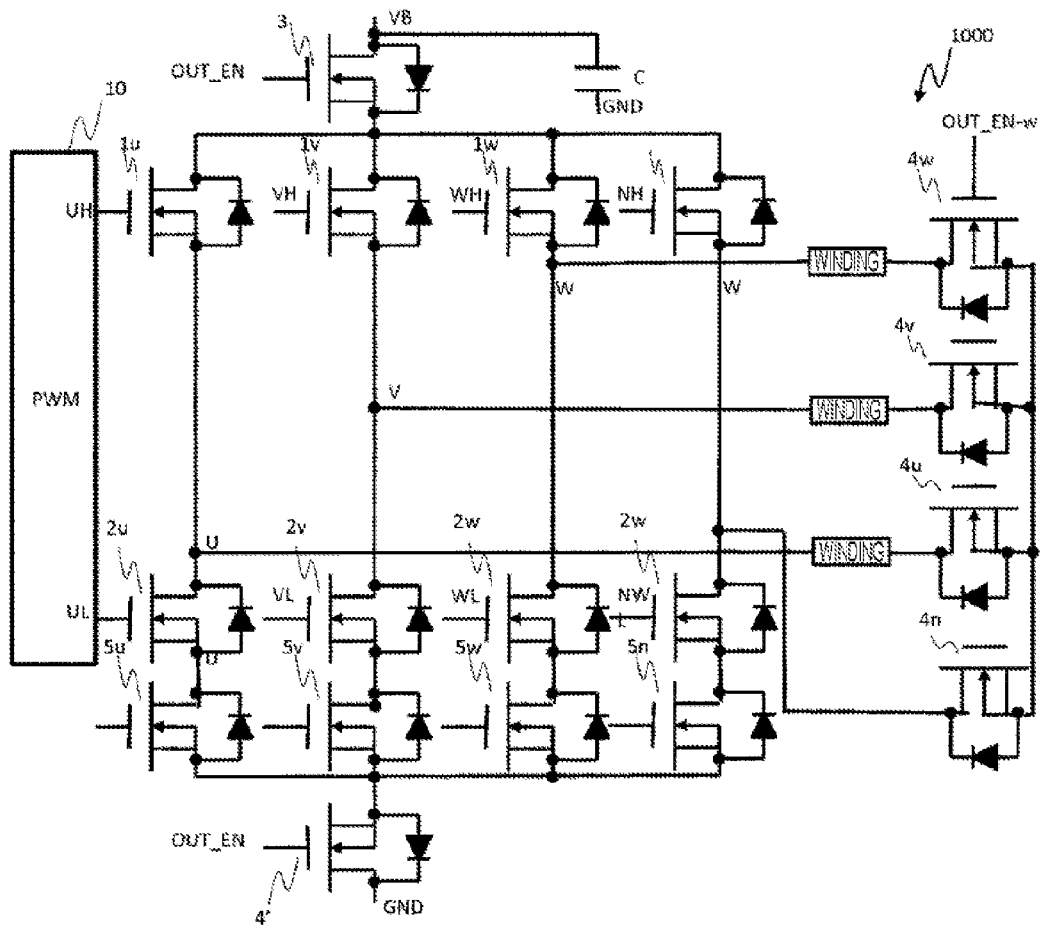
FIG. 11 is a circuit diagram in which a semiconductor relay is inserted in a neutral point, according to an embodiment.

FIG. 10 is a circuit diagram in which a third MOSFET group 3u to 3w, 3n is inserted on the side of a neutral point of a motor according to an embodiment. FIG. 11 is a circuit diagram in which a fourth MOSFET group 4u to 4w, 4n is inserted on the side of a neutral point of a motor according to an embodiment. A third MOSFET 3' in FIG. 10 serves to interrupt a current loop when a path between a winding and a neutral point is short-circuited to the power source. When a short circuit is unlikely to occur, the third MOSFET 3' is unnecessary. A fourth MOSFET 4' in FIG. 9 serves to interrupt a current loop when a path between a winding and a neutral point is short-circuited to the ground.

Like the embodiments in FIGS. 4 and 5, in FIG. 10, the third MOSFET group 3u to 3w, 3n serves to cause a regenerative current from a motor 8 to flow so as to prevent the motor 8 from receiving regenerative braking when any of a first MOSFET group 1u to 1w, 1n and a second MOSFET group 2u to 2w, 1n included in three phases and a neutral point driving inverter, is short-circuited. The third MOSFET group 3u to 3w, 3n is inserted on the side of a neutral point.

In FIG. 8, a fifth MOSFET group 5u to 5w, 5n serves to prevent a VB from being continuously applied to a winding of the motor through parasitic diodes of the third MOSFET group 3u to 3w, 3n even when the first MOSFET group 1u to 1w, 1n has a short fault. In FIG. 9, even when the second MOSFET group 2u to 2w, 1n is short-circuited, a fifth MOSFET group 5u to 5w, 5n serves to prevent the winding of the motor from being a GND potential through parasitic diodes of the fourth MOSFET group 4u to 4w, 4n. The fifth MOSFET group 5u to 5w, 5n also serves to interrupt entire current.

Note that, directions of the semiconductor switches 3u to 3w and directions of the semiconductor switches 4u to 4w can be applicable. The direction illustrated in FIG. 9 is better since source potential can be shared and a circuit for driving 4u to 4w can be shared.

Sixth Embodiment

Figure 12:
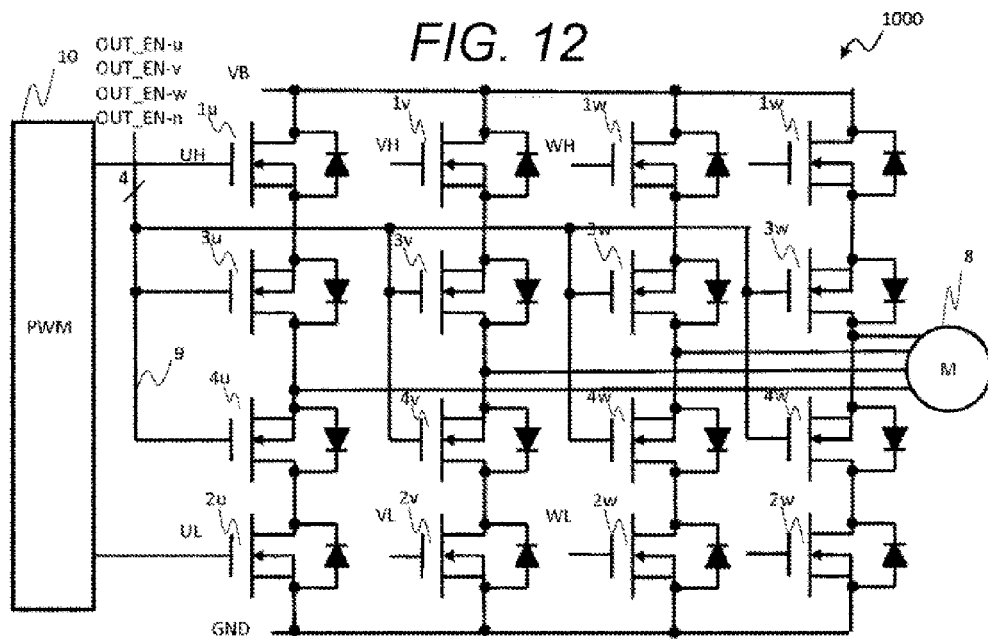
FIG. 12 is a circuit diagram in which a semiconductor switching element is inserted in an inverter in series, according to an embodiment.

FIG. 12 is a circuit diagram of a power conversion device 1000 according to the second embodiment of the present invention. In FIG. 12, a third MOSFET group 3u to 3w, 3n is connected in series with a first MOSFET group 1u to 1w, 1n so that directions of parasitic diodes of the third MOSFET group 3u to 3w, 3n are inverse to those of the first MOSFET group 1u to 1w, 1n between each of pieces of phase output of the power conversion device 1000 and a power source. A fourth MOSFET group 4u to 4w, 4n is connected in series with a second MOSFET group 2u to 2w, 2n so that parasitic diodes of the fourth MOSFET group 4u to 4w, 4n are inverse to those of the second MOSFET group 2u to 2w, 2n between each of the pieces of phase output of the power conversion device 1000 and a ground.

In a normal state, the third MOSFET 3u to 3w and the fourth MOSFET group 4u to 4w are turned on. Normal motor driving operation can be achieved with the first MOSFET group 1u to 1w and the second MOSFET group 2u to 2w. When a single failure occurs, the third MOSFET group 3u to 3w and the fourth MOSFET group 4u to 4w corresponding to a phase in which the failure has occurred are turned off. The third MOSFET 3n and the fourth MOSFET 4n for driving a neutral point are turned on. Normal two phases and the neutral point are driven so that a motor continues to operate. In an abnormal state, such as a multiple failure in which the motor cannot continue to operate, the third MOSFET group 3u to 3w, 3n, and the fourth MOSFET group 4u to 4w, 4n are turned off. A short circuit closed circuit described in the first embodiment is not formed due to the parasitic diodes. Thus, a three-phase inverter circuit can be separated from the motor 8.

Seventh Embodiment

Figure 13:
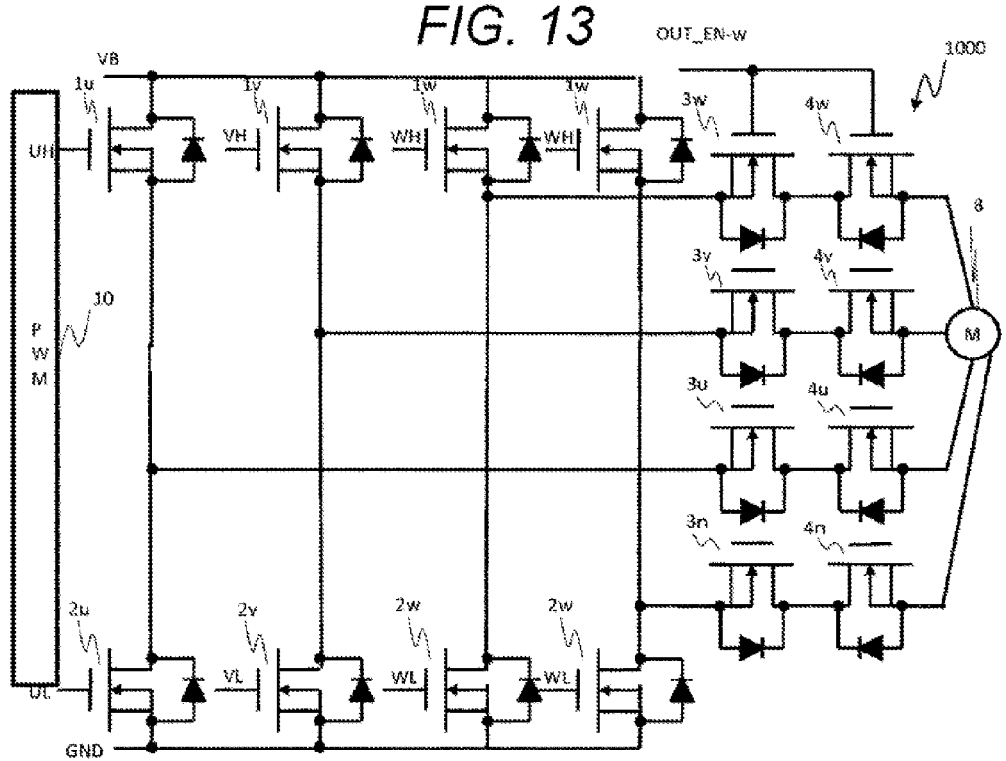
FIG. 13 is a circuit diagram in which a semiconductor switching element is inserted in phase output in series, according to an embodiment.

FIG. 13 is a circuit diagram of a power conversion device 1000 according to a third embodiment of the present invention. In FIG. 13, a third MOSFET group 3u to 3w, 3n and a fourth MOSFET group 4u to 4w, 3n are connected in series between each of pieces of phase output of the power conversion device 1000 and each of pieces of phase output of a motor 8. Directions of parasitic diodes of the third MOSFET group 3u to 3w, 3n and directions of parasitic diodes of the fourth MOSFET group 4u to 4w, 3n are disposed so as to be inverse to each other.

A first MOSFET group 1u to 1w and a second MOSFET group 2u to 2w perform normal motor driving operation. The third MOSFET group 3u to 3w, 3n and the fourth MOSFET group 4u to 4w, 4n are controlled by a signal line OUT_EN so as to be turned on in a normal state and be turned off in an abnormal state. In the normal state, since the third MOSFET group 3u to 3w and the fourth MOSFET group 4u to 4w have been turned on, the first MOSFET group 1u to 1w and the second MOSFET group 2u to 2w can achieve the normal motor driving operation. When a single failure occurs, the third MOSFET group 3u to 3w and the fourth MOSFET group 4u to 4w are turned off and the third MOSFET 3n and the fourth MOSFET 4n across a neutral point are turned on. Normal two phases and the neutral point are driven so that the motor continues to operate. In an abnormal state, such as a multiple failure in which the motor cannot continue to operate, the third MOSFET group 3u to 3w, 3n, and the fourth MOSFET group 4u to 4w, 4n are turned off. A short circuit closed circuit described in the first embodiment is not formed due to the parasitic diodes. Thus, a three-phase inverter circuit can be separated from the motor 8.

Instead of the third MOSFET group 3u to 3w, 3n, and the fourth MOSFET group 4u to 4w, 4n, for example, thyristors, IGBTs, or bipolar transistors connected in parallel with each other in reverse directions, may be connected in series between each of the pieces of phase output of the power conversion device 1000 and each of the pieces of phase output of the motor 8, the thyristors, the IGBTs, and the bipolar transistors each not including parasitic diodes.

For an apparatus with an operating power source voltage between approximately 12 and 36 V, a voltage drop, due to a semiconductor element, is considerable compared to the operating power source voltage. Thus, as a semiconductor element, a MOSFET having a small voltage drop is sometimes used as illustrated in FIG. 1. For example, a thyristor, an IGBT, and a bipolar transistor each that do not include a parasitic diode can be used. However, a voltage drop of approximately 0.7 V caused by a PN junction, occurs.

As illustrated in FIG. 13, in a case where the MOSFETs are connected in series in reverse directions, a similar voltage drop occurs. Therefore, even in a case where, for example, the thyristor, the IGBT, or the bipolar transistor is used, substantially the same effect can be acquired as in FIG. 13.

Eighth Embodiment

Figure 14:
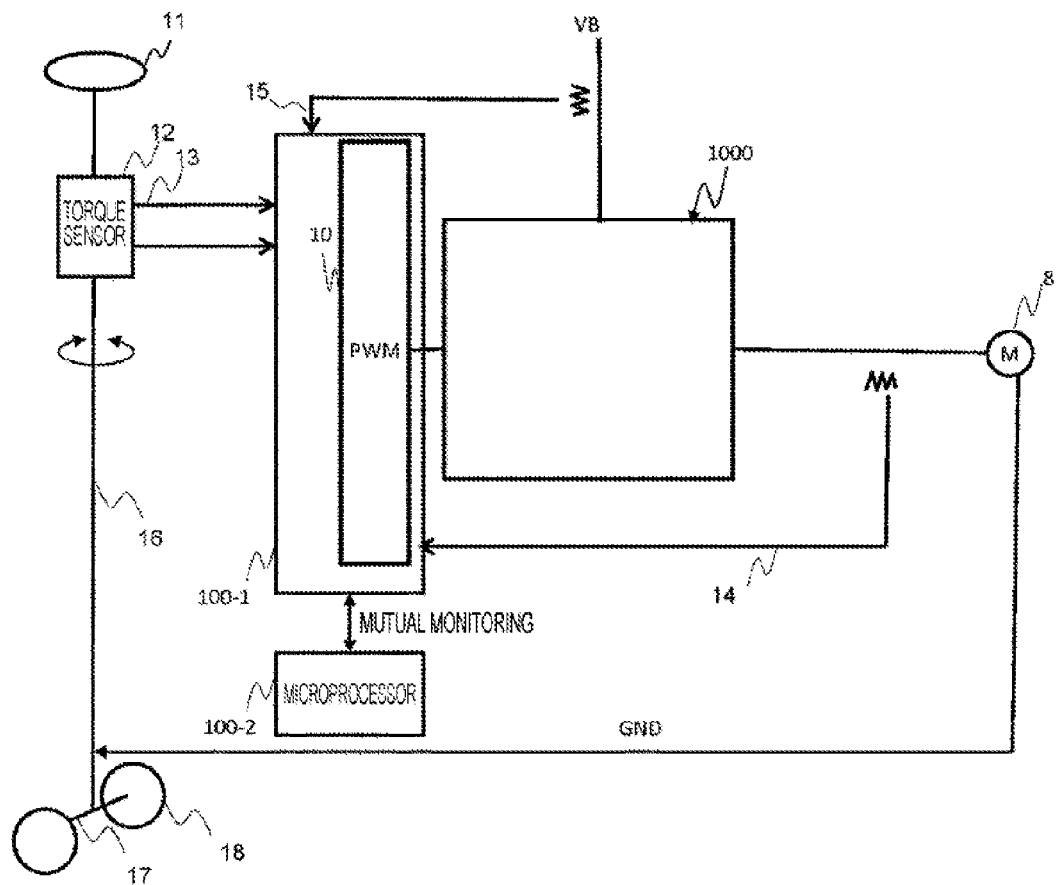
FIG. 14 is a diagram of a configuration of an electric power steering system according to the present invention.

FIG. 14 is a diagram of a configuration of an electric power steering system according to an eighth embodiment. The electric power steering system includes a circuit configuration similar to that of the power conversion device 1000 described in any of the first, second, third, fourth, fifth, sixth, and seventh embodiments, and further includes a steering wheel 11, a rotary shaft 16 fixed to the steering wheel 11, a torque sensor 12 fixed to the rotary shaft 16, a steering mechanism 17, microprocessors 100-1 and 100-2, and a motor 8. A phase current detecting signal 14 and an entire current detecting signal 15 are input into the microprocessor 100-1.

The rotary shaft 16 steers the steering mechanism 17 so that a direction of a wheel 18 is controlled. The motor 8 assists steering effort to the steering mechanism 17 or the rotary shaft 16. Based on output 13 of the torque sensor 12, the microprocessor 100-1 outputs a control signal with respect to a first MOSFET group 1u to 1w, 1n, a second MOSFET group 2u to 2w, 2n, a third MOSFET group 3u to 3w, 3n, a fourth MOSFET 4 or a fourth MOSFET group 4u to 4w, 4n, and a fifth MOSFET group 5u to 4w, 5n through a PWM timer 10 so as to cause the phase current detecting signal 14 to be a target value. A three-phase or four-phase inverter including these switching elements drives the motor 8.

When a single failure occurs, the third MOSFET group 3u to 3w, 3n, the fourth MOSFET 4 or the fourth MOSFET group 4u to 4w, 4n, and the fifth MOSFET group 5u to 4w, 5n corresponding to a phase in which the failure has occurred, are turned off. Phase output of the phase is interrupted and separated. In the four-phase inverter, the remaining three phases causes the motor to continue to operate. In the three-phase inverter, the third MOSFET 3n, the fourth MOSFET 4 or 4n, and the fifth MOSFET 5n across a neutral point are turned on. The remaining two phases and the neutral point are driven so that the motor continues to operate.

Therefore, the electric power steering system according to the present embodiment can continue the operation even when the single failure occurs in the inverter.

When an abnormality further occurs, the abnormality is detected from, for example, the phase current detecting signal 14. The third MOSFET group 3u to 3w, 3n, the fourth MOSFET 4 or the fourth MOSFET group 4u to 4w, 4n, and the fifth MOSFET group 5u to 4w, 5n, are turned off so that the motor 8 is securely separated from the power conversion device (three-phase or four-phase inverter). Accordingly, an operation by man power with respect to the motor 8, namely, an operation with respect to the rotary shaft 16 and the steering mechanism 17 can be prevented from being interrupted, the operations to be added to the steering wheel 11. Thus, safety can be secured. When an excess current occurs, an abnormality is detected from the entire current detecting signal 15. The fifth MOSFET group 5u to 4w, 5n securely interrupts a power source. Thus, safety can be secured.

Ninth Embodiment

Figure 15:
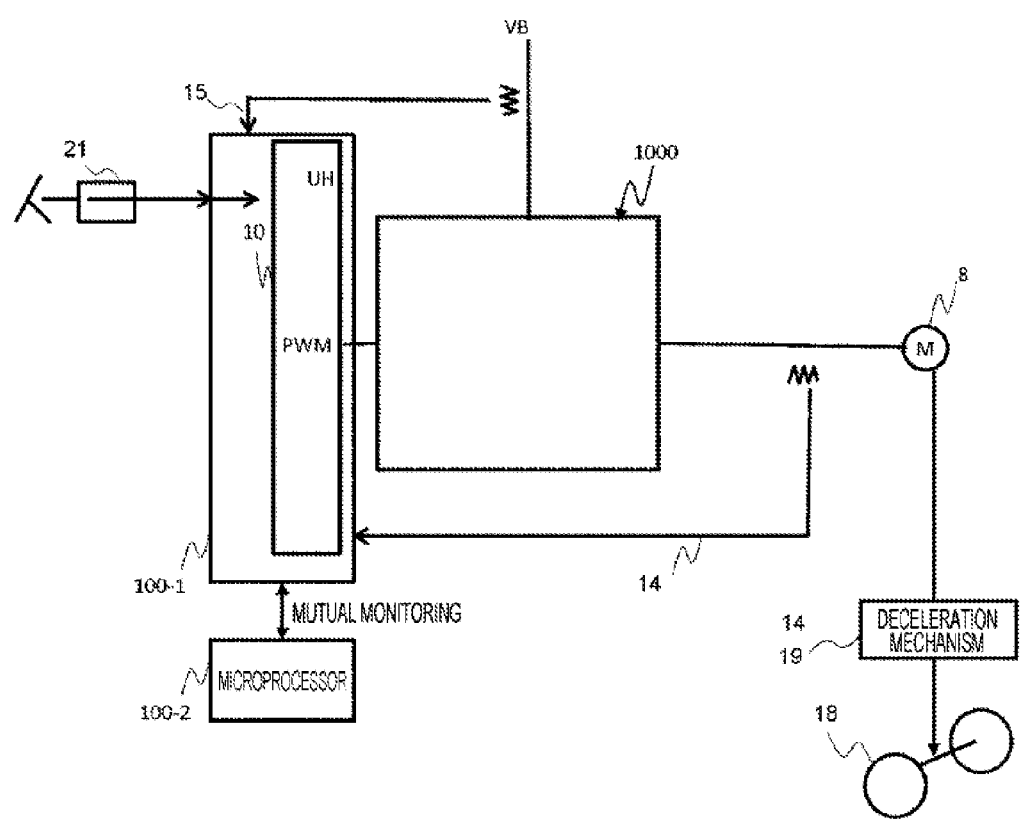
FIG. 15 is a diagram of a configuration of an electric vehicle according to the present invention.

FIG. 15 is a diagram of a configuration of an electric vehicle according to a ninth embodiment of the present invention. The electric vehicle includes a circuit configuration similar to that of the power conversion device 1000 described in any of the first, second, third, fourth, fifth, sixth, and seventh embodiments, and further includes an accelerator position sensor 21 detecting a pedaling amount of an accelerator pedal, microprocessors 100-1 and 100-2, a motor 8, a wheel 18 driven by the motor, and a deceleration mechanism 19 as necessary.

A phase current detecting signal 14 and an entire current detecting signal 15 are input into the microprocessor 100-1. Based on output of the accelerator position sensor 21, the microprocessor 100-1 outputs a control signal with respect to a first MOSFET group 1u to 1w, 1n, a second MOSFET group 2u to 2w, 2n, a third MOSFET group 3u to 3w, 3n, a fourth MOSFET 4 or a fourth MOSFET group 4u to 4w, 4n, and a fifth MOSFET group 5u to 4w, 5n through a PWM timer 10. A three-phase or four-phase inverter including these switching elements drives the motor 8.

When a single failure occurs, the third MOSFET group 3u to 3w, 3n, the fourth MOSFET 4 or the fourth MOSFET group 4u to 4w, 4n, and the fifth MOSFET group 5u to 4w, 5n corresponding to a phase in which the failure has occurred, are turned off. Phase output of the phase is interrupted and separated. In the four-phase inverter, the remaining three phases causes the motor to continue to operate. In the three-phase inverter, the third MOSFET 3n, the fourth MOSFET 4 or 4n, and the fifth MOSFET 5n across a neutral point are turned on. The remaining two phases and the neutral point are driven so that the motor continues to operate.

Therefore, the electric vehicle according to the present embodiment can continue the operation even when the single failure occurs in the inverter.

When an abnormality further occurs, the abnormality is detected from, for example, the phase current detecting signal 14. The third MOSFET group 3u to 3w, 3n, the fourth MOSFET 4 or the fourth MOSFET group 4u to 4w, 4n, and the fifth MOSFET group 5u to 4w, 5n, are turned off so that the motor 8 is securely separated from the power conversion device (three-phase or four-phase inverter). Accordingly, regenerative braking of the motor 8, namely, the wheel 18 and sudden braking driven by the wheel 18 with respect to a vehicle body (not illustrated) can be prevented.

Tenth Embodiment

Figure 16:
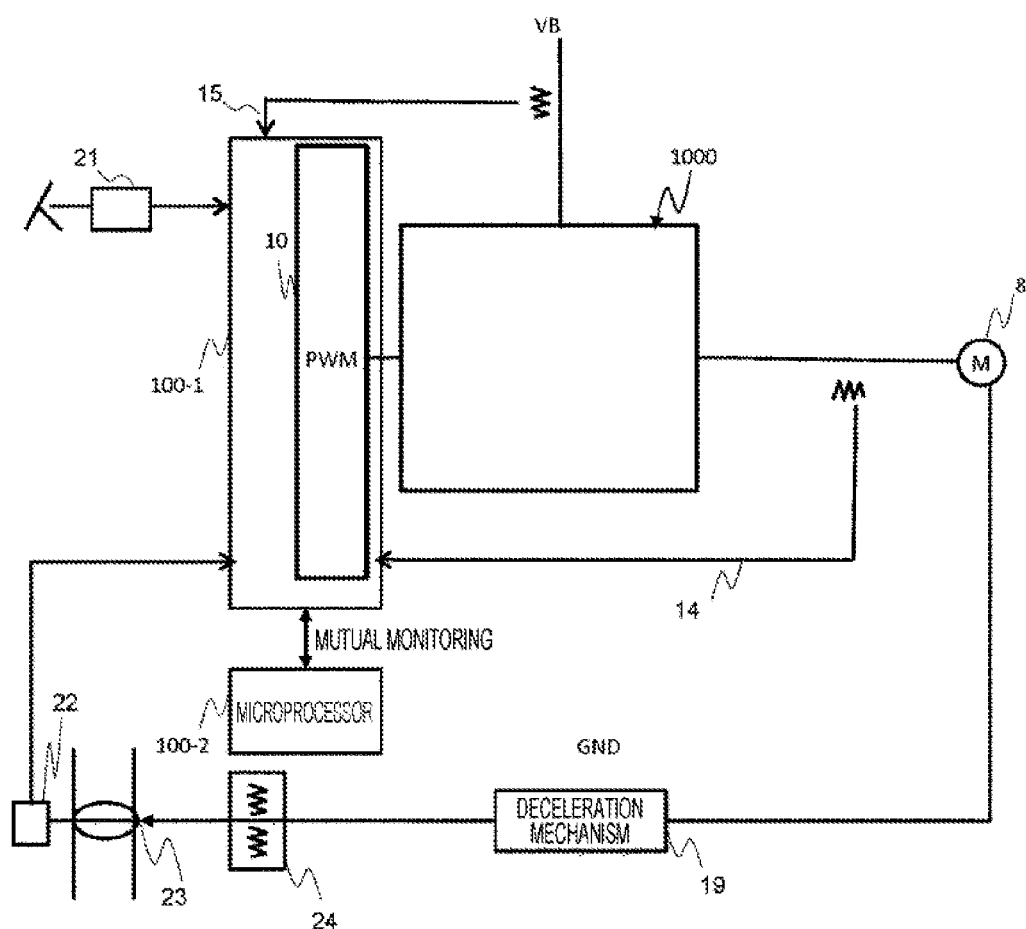
FIG. 16 is a diagram of a configuration of an electronic control throttle according to the present invention.

FIG. 16 is a diagram of a configuration of an electronic control throttle according to a tenth embodiment of the present invention. The electronic control throttle includes a circuit configuration similar to that of the power conversion device 1000 described in any of the first, second, third, fourth, fifth, sixth, and seventh embodiments, and further includes an accelerator position sensor 21 detecting a pedaling amount of an accelerator pedal, microprocessors 100-1 and 100-2, a motor 8, a throttle valve 23 driven by the motor 8, a throttle position sensor 22 measuring a degree of opening of the throttle valve 23, a default position mechanism 24 causing the throttle valve 23 to have a degree of predetermined opening with which a brake can control speed when driving force of the motor 8 has been lost, and a deceleration mechanism 19 as necessary.

A phase current detecting signal 14 and an entire current detecting signal 15 are input into the microprocessor 100-1. Based on output of the accelerator position sensor 21, the microprocessor 100-1 outputs a control signal with respect to a first MOSFET group 1u to 1w, 1n, a second MOSFET group 2u to 2w, 2n, a third MOSFET group 3u to 3w, 3n, a fourth MOSFET 4 or a fourth MOSFET group 4u to 4w, 4n, and a fifth MOSFET group 5u to 4w, 5n through a PWM timer 10 so as to cause a degree of opening of the throttle valve 23 measured by the throttle position sensor 22 to be the degree of predetermined opening. A three-phase or four-phase inverter including these switching elements drives the motor 8.

When a single failure occurs, the third MOSFET group 3u to 3w, 3n, the fourth MOSFET 4 or the fourth MOSFET group 4u to 4w, 4n, and the fifth MOSFET group 5u to 4w, 5n corresponding to a phase in which the failure has occurred, are turned off. Phase output of the phase is interrupted and separated. In the four-phase inverter, the remaining three phases causes the motor to continue to operate. In the three-phase inverter, the third MOSFET 3n, the fourth MOSFET 4 or 4n, and the fifth MOSFET 5n across a neutral point are turned on. The remaining two phases and the neutral point are driven so that the motor continues to operate.

Therefore, the electronic control throttle according to the present embodiment can continue the operation even when the single failure occurs in the inverter.

When, for example, an abnormality further occurs in the power conversion device (three-phase inverter), the abnormality is detected from, for example, the phase current detecting signal 14. The third MOSFET group 3u to 3w, 3n, the fourth MOSFET 4 or the fourth MOSFET group 4u to 4w, 4n, and the fifth MOSFET group 5u to 4w, 5n, are turned off so that the motor 8 is securely separated from the power conversion device (three-phase or four-phase inverter). The default position mechanism 24 causes the throttle valve 23 to maintain the degree of predetermined opening. Accordingly, the brake can control the speed. Thus, travelling can be continued.

Eleventh Embodiment

Figure 17:
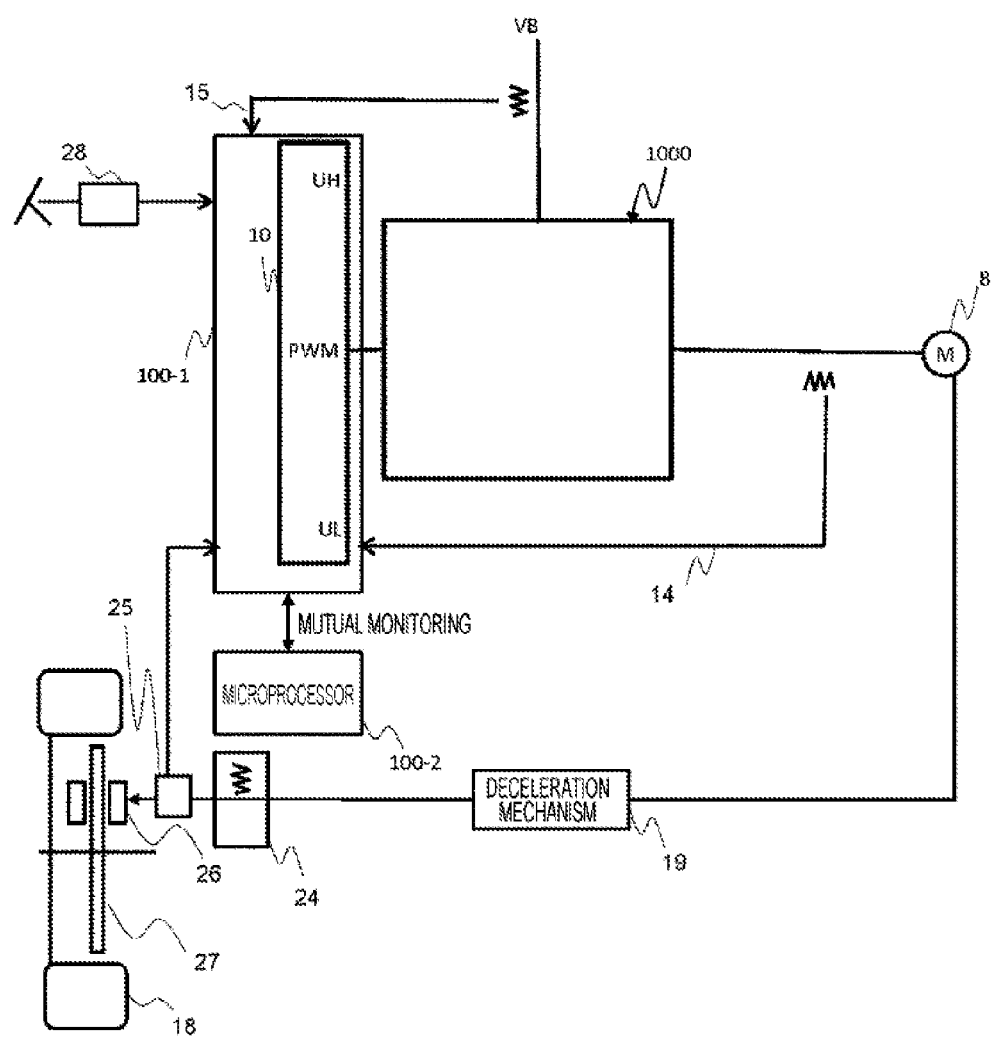
FIG. 17 is a diagram of a configuration of an electric brake according to the present embodiment.

FIG. 17 is a diagram of a configuration of an electric brake according to an eleventh embodiment of the present invention. The electric brake includes a circuit configuration similar to that of the power conversion device 1000 described in any of the first, second, third, fourth, fifth, sixth, and seventh embodiments, and further includes a brake pedal position sensor 28 detecting a pedaling amount of a brake pedal, microprocessors 100-1 and 100-2, a motor 8, a brake friction pad 26 driven by the motor 8, a thrust sensor 25 measuring a thrust amount of the brake friction pad 26 to a rotor 27, a default position mechanism 24 maintaining the brake friction pad 26 at a position away from the rotor 27 when driving force of the motor 8 has been lost, and a deceleration mechanism 19 as necessary.

A phase current detecting signal 14 and an entire current detecting signal 15 are input into the microprocessor 100-1. Based on output of the brake pedal position sensor 28, the microprocessor 100-1 outputs a control signal with respect to a first MOSFET group 1u to 1w, 1n, a second MOSFET group 2u to 2w, 2n, a third MOSFET group 3u to 3w, 3n, a fourth MOSFET 4 or a fourth MOSFET group 4u to 4w, 4n, and a fifth MOSFET group 5u to 4w, 5n through a PWM timer 10 so as to cause the thrust amount of the brake friction pad 26 to the rotor 27 to be a predetermined value, the thrust amount being measured by the thrust sensor 25. A three-phase or four-phase inverter including these switching elements drives the motor 8.

When a single failure occurs, the third MOSFET group $3u$ to $3w$, $3n$, the fourth MOSFET 4 or the fourth MOSFET group $4u$ to $4w$, $4n$, and the fifth MOSFET group $5u$ to $4w$, $5n$ corresponding to a phase in which the failure has occurred, are turned off. Phase output of the phase is interrupted and separated. In the four-phase inverter, the remaining three phases causes the motor to continue to operate. In the three-phase inverter, the third MOSFET $3n$, the fourth MOSFET 4 or $4n$, and the fifth MOSFET $5n$ across a neutral point are turned on. The remaining two phases and the neutral point are driven so that the motor continues to operate.

Therefore, the electric brake according to the present embodiment can continue the operation even when the single failure occurs in the inverter.

When, for example, an abnormality further occurs in the power conversion device (three-phase inverter), the abnormality is detected from, for example, the phase current detecting signal 14. The third MOSFET group $3u$ to $3w$, $3n$, the fourth MOSFET 4 or the fourth MOSFET group $4u$ to $4w$, $4n$, and the fifth MOSFET group $5u$ to $4w$, $5n$, are turned off so that the motor 8 is securely separated from the power conversion device (three-phase or four-phase inverter). The default position mechanism 24 causes the brake friction pad 26 to remain at the position away from the rotor 27. Accordingly, sudden braking driven by a wheel 18 with respect to a vehicle body (not illustrated) can be prevented.

Twelfth Embodiment

Figure 18:
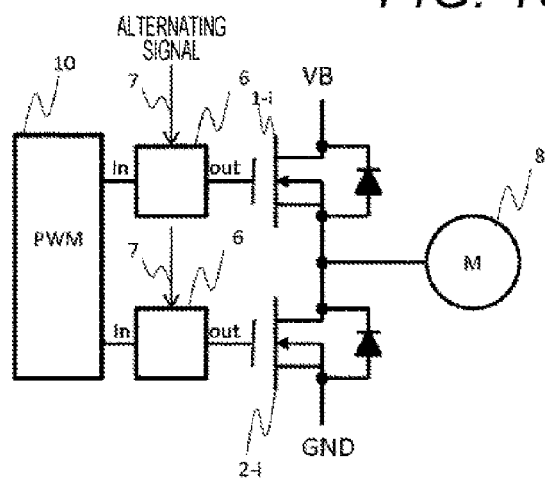
FIG. 18 is a diagram of a circuit configuration around an actual PWM timer 10.

FIG. 18 is a diagram of a circuit configuration around a PWM timer 10 in a power conversion device 1000 according to a twelfth embodiment of the present invention. A pre-driver 6 with a charge pump includes a charge pump 61 that is operated by an alternating signal 7 to be input, and a pre-driver 62 that is operated by a power source voltage boosted by the charge pump 61. The pre-driver 6 with the charge pump controls a gate terminal of a first MOSFET group $1u$ to $1w$ and a gate terminal of a second MOSFET group $2u$ to $2w$. Note that, for simplicity, only a first MOSFET $1i$ and a second MOSFET $2i$ (any of i=u, v, w, and n) for one phase are illustrated in FIG. 18.

An output failure of a semiconductor element is often caused by a stuck-at fault in which output sticks to an H or an L. As a signal for permitting output in a normal state, using the alternating signal 7 prevents the output from being fixed in a state where the output has been permitted due to the stuck-at fault. In addition, it can be confirmed that operation in which a level is periodically alternately varied between the H and the L, is possible.

Figure 19:
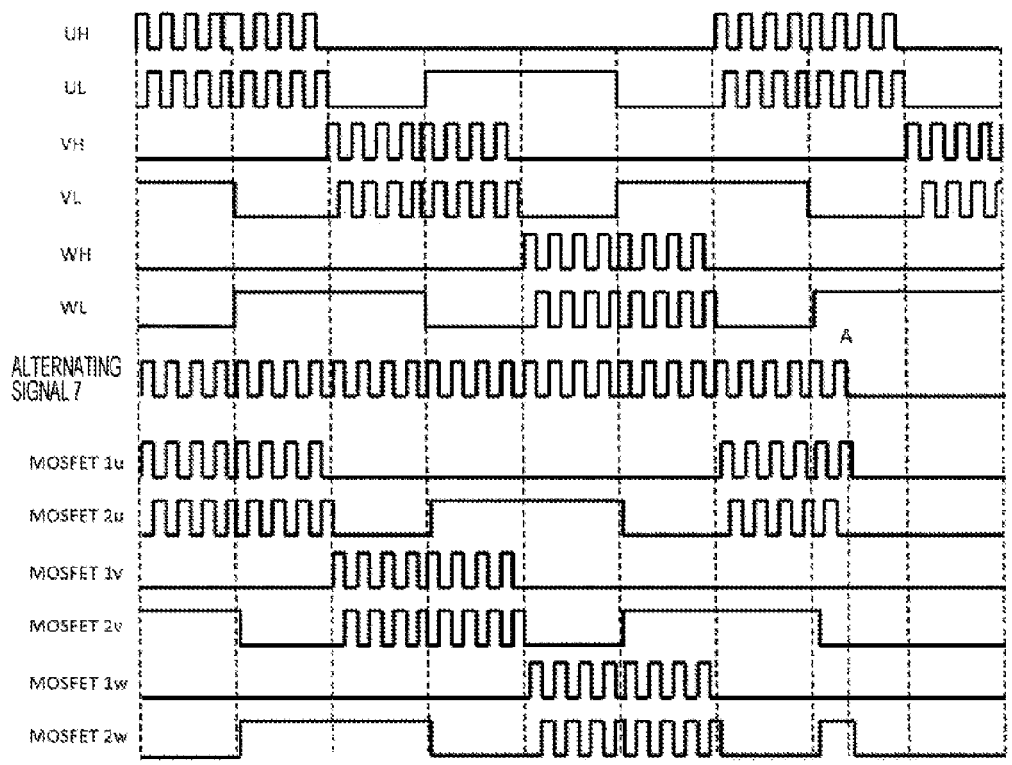
FIG. 19 is a timing diagram of operation of a circuit diagram illustrated in FIG. 14.

FIG. 19 is a timing diagram of operation of the circuit configuration illustrated in FIG. 18. A UH, a VH, and a WH are drive signals of an upper arm with U, V, W phases output from the PWM timer 10, respectively. A UL, a VL, and a WL are drive signals of a lower arm with U, V, W phases output from the PWM timer 10, respectively. Before time A when an alternating signal 7 has been generated, a first MOSFET group $1u$ to $1w$, a second MOSFET group $2u$ to $2w$ has been driven. After time A when the alternating signal 7 has been stopped, the first MOSFET group $1u$ to $1w$ and the second MOSFET group $2u$ to $2w$ has not driven and turned off.

By the operation illustrated in FIG. 19, in particular, when an abnormality occurs in the microprocessor 100, the alternating signal 7 is stopped so that operation of a three-phase inverter can be stopped. Therefore, safety can be secured.

Figure 20:
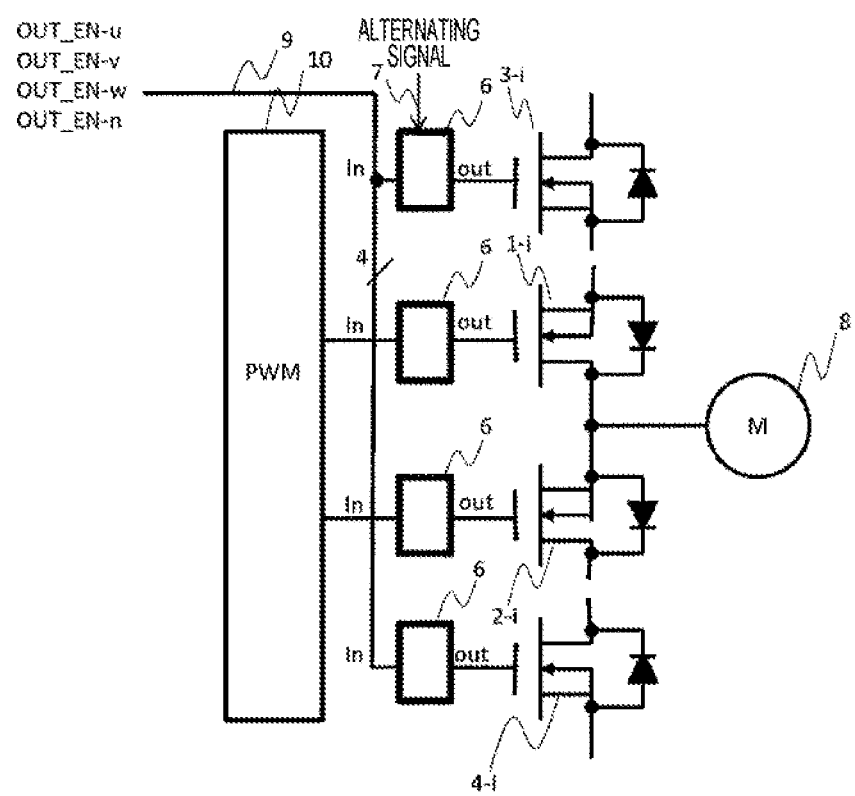
FIG. 20 is a diagram according to a modification of FIG. 14.

FIG. 20 is a diagram according to a modification of FIG. 18. In FIG. 20, in addition to a gate terminal of a first MOSFET group $1u$ to $1w$, $1n$, a gate terminal of a second MOSFET group $2u$ to $2w$, $2n$, an alternating signal 7 drives a gate terminal of a third MOSFET 3 group $3u$ to $3w$, $3n$, and a gate terminal of a fourth MOSFET 4 group $4u$ to $4w$, $4n$. A pre-driver 6 with a charge pump can also individually control a fifth MOSFET group $5u$ to $4w$, $5n$ each phase.

According to the present embodiment, when in particular the microprocessor 100 is a normal state and the alternating signal 7 has been acquired, an OUE_EN is individually controlled each phase. Thus, when a single failure occurs in a power converter 1000, the third MOSFET 3 group $3u$ to $3w$, $3n$, the fourth MOSFET 4 group $4u$ to $4w$, $4n$, and the fifth MOSFET group $5u$ to $4w$, $5n$ are controlled so as to interrupt and separate a phase in which the failure has occurred. After that, phases in which the failure has not occurred drive a motor. Thus, the operation can be continued. Furthermore, when the microprocessor 100 is in an abnormal state and the alternating signal 7 is not acquired, the third MOSFET 3 group $3u$ to $3w$, $3n$, the fourth MOSFET 4 group $4u$ to $4w$, $4n$, and the fifth MOSFET group $5u$ to $4w$, $5n$, are turned off so as to stop motor drive with respect to all the phases. Thus, safety can be secured.

Note that, in the above operation, for each phase, a logical product (AND) between the OUE_EN and a signal indicating that the microprocessor 100 is in a normal state, drives the pre-driver. That is, even when the pre-driver 6 with the charge pump is replaced by a pre-driver with a logical product (AND), a similar effect can be acquired. Furthermore, like the present embodiment, adopting the pre-driver 6 with the charge pump driven by the alternating signal 7 avoids that the third MOSFET 3 group $3u$ to $3w$, $3n$, the fourth MOSFET 4 group $4u$ to $4w$, $4n$, and the fifth MOSFET group $5u$ to $4w$, $5n$ cannot be turned off due to a failure that fixes output of the logical product (AND) or the pre-driver to the H. Thus, when a failure occurs in the pre-driver 6 with the charge pump, the third MOSFET 3 group $3u$ to $3w$, $3n$, the fourth MOSFET 4 group $4u$ to $4w$, $4n$, and the fifth MOSFET group $5u$ to $4w$, $5n$ can be securely turned off. Safety can be secured.

Figure 21:
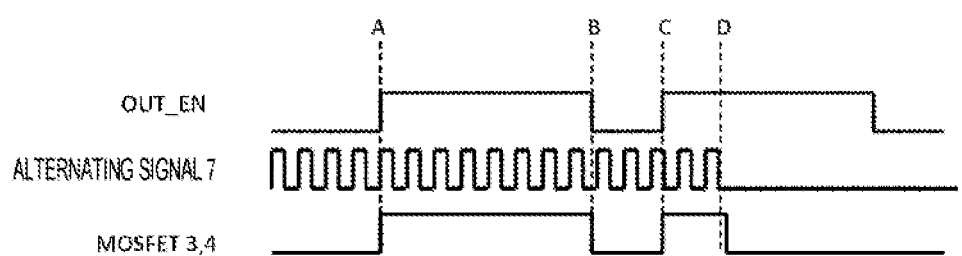
FIG. 21 is a timing diagram of operation of a circuit configuration illustrated in FIG. 16.

FIG. 21 is a timing diagram of the operation of the circuit configuration illustrated in FIG. 20. Before time D when the alternating signal 7 has been generated, the OUT_EN can control the third MOSFET group $3u$ to $3w$ and the fourth MOSFET group $4u$ to $4w$. Between time A to time B between which the OUT_EN has been turned on, the third MOSFET 3 group $3u$ to $3w$ and the fourth MOSFET 4 group $4u$ to $4w$ have been turned on. Between time B to time C between which the OUT_EN has been turned off, the MOSFETs have been turned off. Between time C to time D between which the OUT_EN has been turned on again and the alternating signal 7 has been generated, the third MOSFET 3 group $3u$ to $3w$ and the fourth MOSFET 4 group $4u$ to $4w$ have been turned on. After time D when the alternating signal 7 has been stopped, the third MOSFET 3 group $3u$ to $3w$ and the fourth MOSFET 4 group $4u$ to $4w$ have been stopped.

By the operation illustrated in FIG. 21, in particular, when an abnormality occurs in the processor, the alternating signal 7 is stopped so that the three-phase inverter and a motor 8 can be separated. Thus, safety can be secured.

Figure 22:
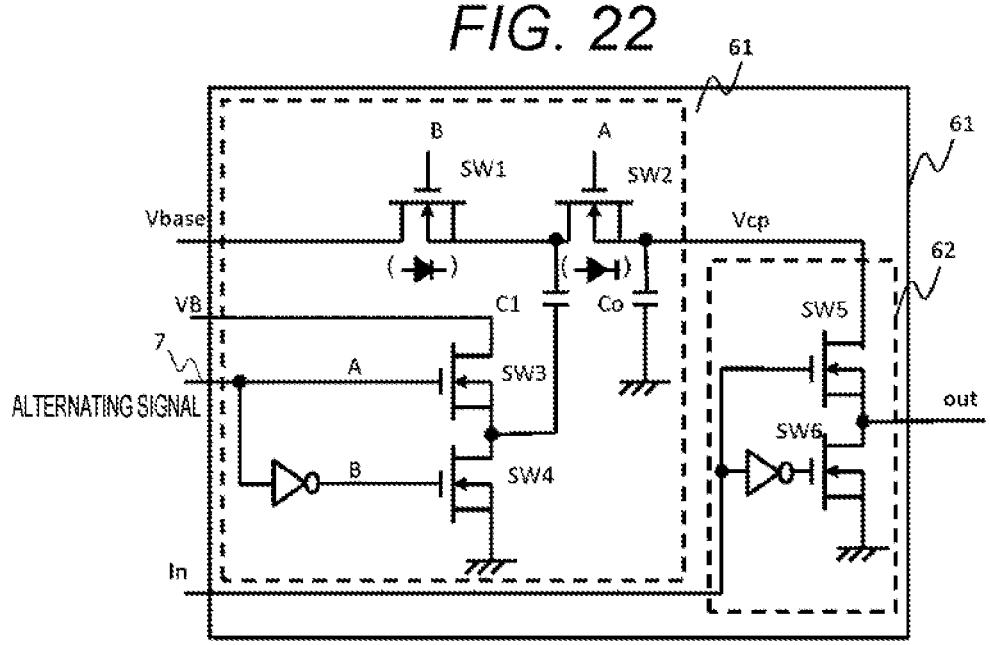
FIG. 22 is a circuit diagram of a pre-driver 6 with a charge pump.

FIG. 22 is a circuit diagram of the pre-driver 6 with the charge pump. The pre-driver 6 with the charge pump includes a charge pump 61 that is operated by an alternating signal 7, and a pre-driver 62 that is operated by a power source boosted by the charge pump 61.

The charge pump 61 includes capacitors C1 and Co, a SW1, a SW2, a SW3, and a SW4 each including a MOSFET. When the SW1 and the SW4 have been turned on, a voltage Vbase is stored in the capacitor C1. When the SW2 and the SW3 have been turned on, the voltage Vbase is added to the VB so as to be charged in the capacitor Co. The above operation is repeated so that potential of the capacitor Co gradually comes close to VCP=Vbase+VB. Note that the SW1 and the SW2 may be diodes.

Based on the voltage boosted as described above, the pre-driver 62 including the SW5 and the SW6 drives a gate terminal of each of the MOSFETs in the power conversion device 1000.

In FIG. 22, a circuit configuration in which the pre-driver 6 with the charge pump includes the one charge pump 61 and the one pre-driver 62, is illustrated. One charge pump 61 and a plurality of pre-drivers 62 can be disposed in the pre-driver 6 with the charge pump.

Note that, the Vbase is connected to a source terminal of each of the MOSFETs to be driven so that the pre-driver 62 outputs a voltage higher than potential of the source terminal by the VB. Thus, a predetermined voltage can be applied between the source and the gate. When Vbase=VB is satisfied, the pre-driver 62 can output a voltage of VCP=2VB.

Figure 23:
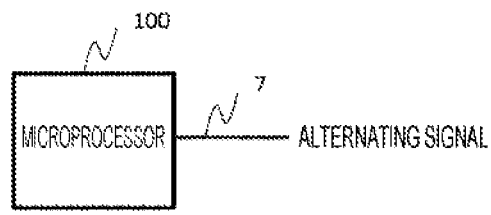
FIG. 23 is a diagram of an exemplary configuration in which a microprocessor 100 generates an alternating signal 7.

FIG. 23 is a diagram of an exemplary configuration in which a microprocessor 100 generates an alternating signal 7. In the microprocessor 100, data for outputting an H and an L is periodically written in a register in an output port so that the alternating signal 7 can be output.

With the exemplary configuration illustrated in FIG. 23, when an abnormality occurs in the microprocessor 100, the data for alternately outputting the H and the L cannot be written in the register in the output port. Thus, the alternating signal 7 cannot be output. Accordingly, the MOSFETs in a power conversion device 1000 are turned off. Thus, safety can be secured.

Figure 24:
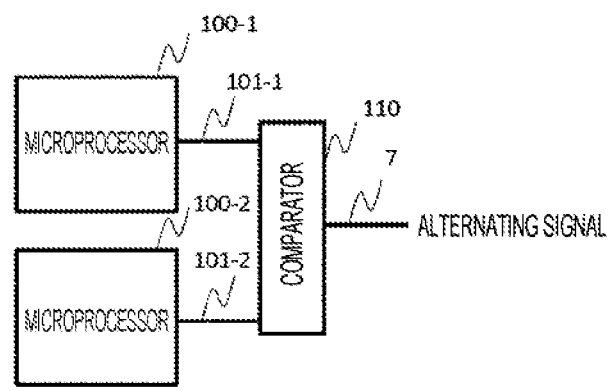
FIG. 24 is a diagram of an exemplary configuration in which a comparator 110 generates an alternating signal 7.

FIG. 24 is a diagram of an exemplary configuration in which a comparator 110 generates an alternating signal 7, the comparator 110 comparing output signals 101-1 of a microprocessor 100-1 and output signal 101-2 of a microprocessor 100-2. In order to output the alternating signal 7 by the comparator 110, an error as a test pattern may be periodically put with respect to the output signals 101-1 and 101-2 to be compared, or the comparator disclosed in JP 07-234801 A may be used.

With the exemplary configuration illustrated in FIG. 24, when an abnormality occurs in any of the microprocessors 100-1 and 100-2, the comparator 110 does not output the alternating signal 7. Accordingly, MOSFETs in a power conversion device 1000 can be turned off. Thus, safety can be secured.

Figure 25:
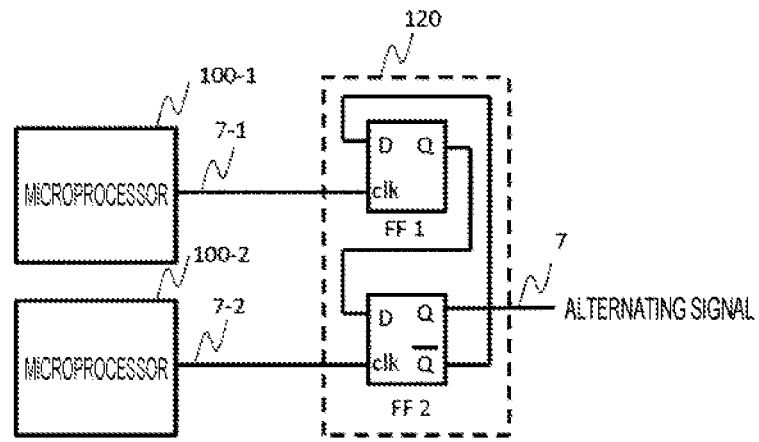
FIG. 25 is a diagram of an exemplary configuration in which an FS-AND 120 generates an alternating signal 7.

FIG. 25 is a diagram of an exemplary configuration in which microprocessors 100-1 and 100-2 generate alternating signals 7-1 and 7-2, respectively, and an FS-AND 120 including FlipFlops (FFs) 1 and 2 generates an alternating signal 7. With the exemplary configuration illustrated in FIG. 25, when an abnormality occurs in any of the microprocessors 100-1 and 100-2, any of the alternating signals 7-1 and 7-2 is not output. Accordingly, MOSFETs in a power conversion device 1000 can be turned off. Thus, safety can be secured.

Figure 26:
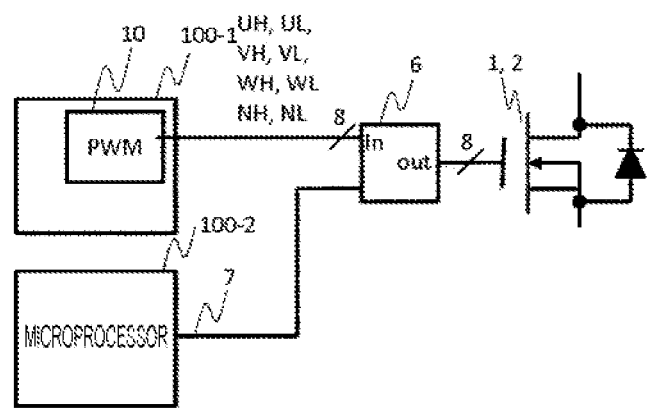
FIG. 26 is diagram of an exemplary configuration in which the pre-driver 6 with the charge pump is controlled by the PWM timer 10.

FIG. 26 is a diagram of an exemplary configuration in which a UH, a UL, a VH, a VL, a WH, and a WL output from a PWM timer 10 built in a microprocessor 100-1, control a pre-driver 6 with a charge pump that is operated by an alternating signal 7 generated by a microprocessor 100-2, so that a first MOSFET group 1u to 1w and a second MOSFET group 2u to 2w are driven. With the exemplary configuration illustrated in FIG. 26, even in a case where the PWM timer 10 outputs wrong signals UH, UL, VH, VL, WH, and WL due to an abnormality of the microprocessor 100-1, when the microprocessor 100-2 stops the alternating signal 7, drive of a first MOSFET group 1u to 1w and drive of a second MOSFET 2 can be stopped and turned off. Therefore, safety can be secured.

Figure 27:
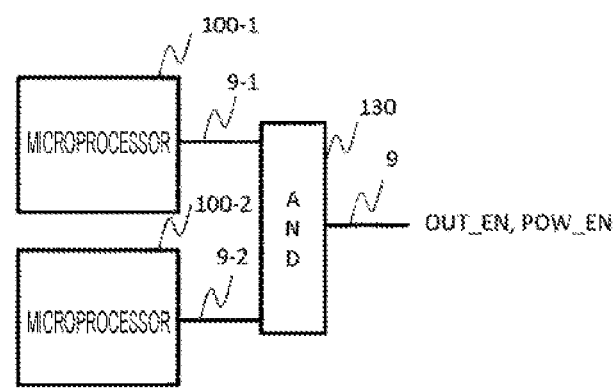
FIG. 27 is a diagram of an exemplary configuration in which output of an AND 130 is defined as an OUT_EN or a POW_EN.

FIG. 27 is a diagram of an exemplary configuration in which microprocessors 100-1 and 100-2 generate OUT_ENs 9-1 and 9-2, respectively, and output of an AND 130 is defined as an OUT_EN or a POW_EN. With the exemplary configuration illustrated in FIG. 27, when any of the microprocessors 100-1 and 100-2 determines that phase output or entire current should be interrupted, these can be interrupted. Thus, safety can be secured.

Figure 28:
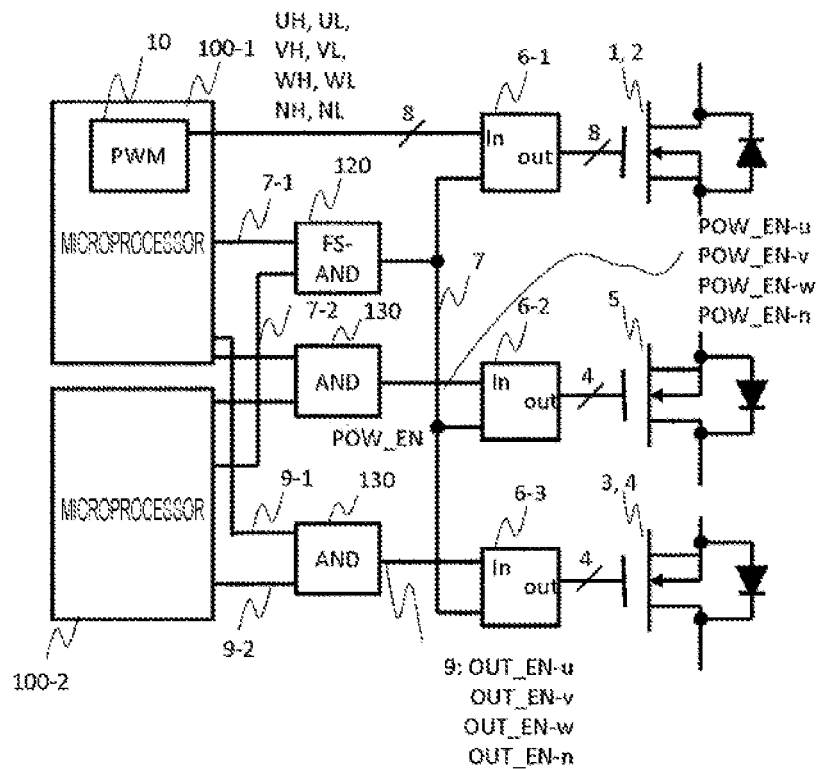
FIG. 28 is a circuit diagram of an exemplary configuration in which an FS-AND of an alternating signal, an AND of an output control signal, and an AND of an entire current control signal are combined.

FIG. 28 is a diagram of an exemplary configuration in which an FS-AND of an alternating signal, an AND of an output control signal, and an AND of an entire current control signal are combined.

The FS-AND 120 generates an alternating signal 7 from alternating signals 7-1 and 7-2 generated by microprocessors 100-1 and 100-2, respectively. The alternating signal 7 operates pre-drivers with charge pumps 6-1 to 6-3. The pre-driver 6-1 with the charge pump is controlled by a UH, a UL, a VH, a VL, a WH, a WL, an NH, and an NL output from a PWM timer 10 built in the microprocessor 100-1, and drives a first MOSFET group 1u to 1w, 1n and a second MOSFET group 2u to 2w2. The pre-driver 6-2 with the charge pump drives a fifth MOSFET group 5u to 5w, 5n by output of an AND 130-1 that is a logical product between POW_ENs generated by the microprocessors 100-1 and 100-2. The pre-driver 6-3 with the charge pump drives a third MOSFET 3 group 3u to 3w, 3n and a fourth MOSFET 4 group 4u to 4w, 4n by output of an AND 130-2 that is a logical product between OUT_ENs 9-1 and 9-2 generated by the microprocessors 100 and 100-2, respectively.

With the exemplary configuration illustrated in FIG. 28, when any of the microprocessors 100-1 and 100-2 determines that operation, phase output, or entire current of a three-phase inverter should be interrupted, these can be interrupted. Thus, safety can be secured. Even in a case where any of the pre-drivers with charge pumps 6-1 to 6-3 continuously drive gate terminals of the MOSFETs due to a failure, the other pre-drivers with charge pumps can stop drive of the gate terminals. Accordingly, any of the first MOSFET group 1u to 1w, 1n, the second MOSFET group 2u to 2w, 2n, the third MOSFET 3 group 3u to 3w, 3n, the fourth MOSFET 4 group 4u to 4w, 4n, and the fifth MOSFET group 5u to 5w, 5n, is turned off. Thus, safety can be secured.

According to the present embodiment, in particular, when the microprocessor 100 is in a normal state and the alternating signal 7 has been acquired, the OUT_EN and the POW_EN are controlled for each phase. Thus, when a single failure occurs in the power converter 1000, the third MOSFET 3 group 3u to 3w, 3n, the fourth MOSFET 4 group 4u to 4w, 4n, and the fifth MOSFET group 5u to 4w, 5n, are controlled so as to interrupt and separate a phase in which the failure has occurred. After that, phases in which the failure has not occurred drive the motor. Thus, the operation can be continued. Furthermore, when the microprocessor 100 is in an abnormal state and the alternating signal 7 is not acquired, the third MOSFET 3 group 3u to 3w, 3n, the fourth MOSFET 4 group 4u to 4w, 4n, and the fifth MOSFET group 5u to 4w, 5n, are turned off so as to stop motor drive with respect to all the phases. Thus, safety can be secured.

Figure 29:
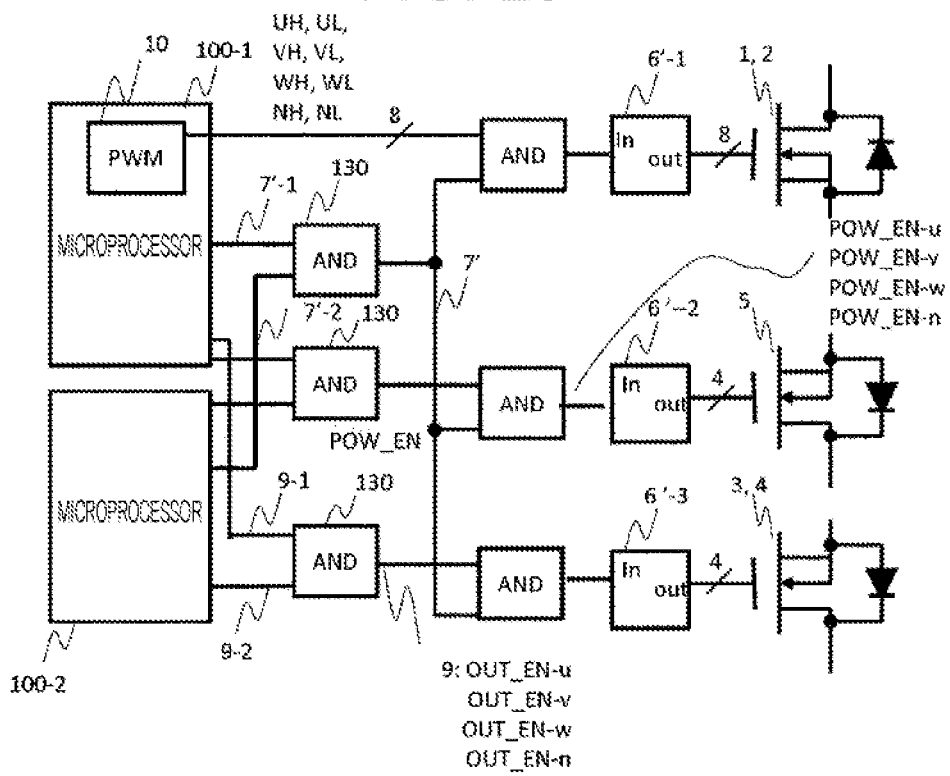
FIG. 29 is a circuit diagram of an exemplary configuration in which, for each phase, a logical product (AND) of an OUT_EN, a POW_EN and a signal 7' indicating that a microprocessor 100 is in a normal state, is combined.

Note that, in the above operation, for each phase as illustrated in FIG. 29, a logical product (AND) 130 between an OUT_EN, a POW_EN, and a signal 7' indicating that a microprocessor 100 is in a normal state, drives a pre-driver. That is, even when the pre-driver 6 with the charge pump is replaced by the logical product (AND) 130 and a typical pre-driver 6', a similar effect can be acquired. Furthermore, like the present embodiment, adopting the pre-driver 6 with the charge pump driven by the alternating signal 7 avoids that the third MOSFET 3 group 3u to 3w, 3n, the fourth MOSFET 4 group 4u to 4w, 4n, and the fifth MOSFET group 5u to 4w, 5n cannot be turned off due to a failure that fixes output of the logical product (AND) or the pre-driver to the H. Thus, when a failure occurs in the pre-driver 6 with the charge pump, the third MOSFET 3 group 3u to 3w, 3n, the fourth MOSFET 4 group 4u to 4w, 4n, and the fifth MOSFET group 5u to 4w, 5n can be securely turned off. Safety can be secured.

The present invention is not limited to the above embodiments, and includes various modifications. The above embodiments have been described in detail in order to easily understand the present invention. The present invention is not necessarily limited to including all the configurations having been described above. A part of a configuration of one embodiment can be replaced with a configuration in another embodiment. A configuration in one embodiment can be added to a configuration in another embodiment. With respect to a part of a configuration in each embodiment, additions, deletions, and replacements of the other configurations may be made.

For example, the three-phase inverter that is used for a DC brushless motor or an AC synchronous motor has been described in the above descriptions as the embodiments of the present invention. Needless to say, the technique provided by the present invention can be applied to an H-bridge used for drive of a motor with a DC brush.

For example, regarding each of the above configurations, functions, processing units, processing steps, parts or all may be achieved by hardware designed with an integrated circuit, for example. For example, each of the above configurations and functions may be achieved by software in which a processor interprets and executes a program for achieving each of the functions. Information, such as the program, a table, or a file for achieving each of the functions, can be stored in a recording device, such as a memory, a hard disk, a Solid State Drive (SSD), or a recording medium, such as an IC card, a SD card, or a DVD.

REFERENCE SIGNS LIST

1: first MOSFET
1u to 1w, 1n: first MOSFET group
2: second MOSFET
2u to 2w, 2n: second MOSFET group
3: third MOSFET
3u to 3w, 3n: third MOSFET group
4: fourth MOSFET
4u to 4w, 4n: fourth MOSFET group
5u to 5w, 5n: fifth MOSFET group
6: pre-driver with a charge pump
7: alternating signal
8: motor
10: PWM timer
100: microprocessor
1000: power conversion device

The invention claimed is:

1. A power conversion device configured to convert power supplied from a power source into a driving current of a motor by using a plurality of semiconductor switching elements, the driving current to be supplied from phase output,
wherein a first semiconductor switching element of the plurality of semiconductor switching elements is disposed between the phase output of the power conversion device and the power source, and a first diode is connected in parallel to the first semiconductor switching element,
a second semiconductor switching element of the plurality of semiconductor switching elements is disposed between the phase output of the power conversion device and a ground, and a second diode is connected in parallel to the second semiconductor switching element,
a third semiconductor switching element of the plurality of semiconductor switching elements is disposed between a winding of the motor and the power source, and a third diode is connected in parallel to the third semiconductor switching element,
a fourth semiconductor switching element of the plurality of semiconductor switching elements is disposed between the winding of the motor and the ground, and a fourth diode is connected in parallel to the fourth semiconductor switching element,
the third diode is configured to allow current flow from the power source to the motor,
the fourth diode is configured to allow current flow from the motor to the ground,
one of the third semiconductor switching element and the fourth semiconductor switching element is connected in series with the winding of the motor, and
the other of the third semiconductor switching element and the fourth semiconductor switching element is connected between the first semiconductor switching element and the power source or between the second semiconductor switching element and the ground.

2. The power conversion device according to claim 1, wherein a fifth semiconductor switching element is connected between the first semiconductor switching element and the power source or between the second semiconductor switching element and the ground, and a fifth diode is connected in parallel with the fifth semiconductor switching element, the fifth diode configured to allow current flow in a same direction as is allowed by the second diode.

3. The power conversion device according to claim 2, wherein a booster circuit includes the third semiconductor switching element as a semiconductor switching element, the booster circuit disposed on a side of the power source of the power conversion device.

4. The power conversion device according to claim 1, wherein a voltage of the power source boosted by a booster circuit controls a gate terminal of at least one of the plurality of semiconductor switching elements, and an alternating signal to be input operates the booster circuit.

5. The power conversion device according to claim 4, further comprising a microprocessor configured to control the first semiconductor switching element and the second semiconductor switching element, wherein the microprocessor outputs the alternating signal.

6. The power conversion device according to claim 4, further comprising:
a first microprocessor and a second microprocessor configured to control the first semiconductor switching element and the second semiconductor switching element, respectively; and
a comparator circuit configured to compare output of the first microprocessor and output of the second microprocessor, and configured to output a result of the comparison,
wherein the comparator circuit outputs the alternating signal as the result of the comparison.

7. A power conversion device configured to convert power supplied from a power source into a driving current of a motor by using a plurality of semiconductor switching elements, the driving current to be supplied from phase output,
wherein a first semiconductor switching element of the plurality of semiconductor switching elements is disposed between the phase output of the power conversion device and the power source, and a first diode is connected in parallel to the first semiconductor switching element,
a second semiconductor switching element of the plurality of semiconductor switching elements is disposed between the phase output of the power conversion device and a ground, and a second diode is connected in parallel to the second semiconductor switching element,
a third semiconductor switching element of the plurality of semiconductor switching elements is disposed between a winding of the motor and the power source, and a third diode is connected in parallel to the third semiconductor switching element,
a fourth semiconductor switching element of the plurality of semiconductor switching elements is disposed between the winding of the motor and the ground, and a fourth diode is connected in parallel to the fourth semiconductor switching element,
the third diode is configured to allow current flow from the power source to the motor,
the fourth diode is configured to allow current flow from the motor to the ground,
one of the third semiconductor switching element and the fourth semiconductor switching element is connected in series with the winding of the motor,
the other of the third semiconductor switching element and the fourth semiconductor switching element is connected between the first semiconductor switching element and the power source or between the second semiconductor switching element and the ground,
the phase output includes at least four pieces of phase output,
either (i) each of the at least four pieces of phase output is connected to a motor having at least four phases, or (ii) each of at least three of the at least four pieces of phase output is connected to a motor having at least three phases, and one of the at least four pieces of phase output is connected to a neutral point of the motor including at least three phases.

8. The power conversion device according to claim 7, wherein a booster circuit includes the third semiconductor switching element as a semiconductor switching element, the booster circuit disposed on a side of the power source of the power conversion device.

9. The power conversion device according to claim 7, wherein a voltage of the power source boosted by a booster circuit controls a gate terminal of at least one of the plurality of semiconductor switching elements, and
an alternating signal to be input operates the booster circuit.

10. The power conversion device according to claim 9, further comprising a microprocessor configured to control the first semiconductor switching element and the second semiconductor switching element,
wherein the microprocessor outputs the alternating signal.

11. The power conversion device according to claim 9, further comprising:
a first microprocessor and a second microprocessor configured to control the first semiconductor switching element and the second semiconductor switching element, respectively; and
a comparator circuit configured to compare output of the first microprocessor and output of the second microprocessor, and configured to output a result of the comparison,
wherein the comparator circuit outputs the alternating signal as the result of the comparison.

12. A power conversion device configured to convert power supplied from a power source into a driving current of a motor by using a plurality of semiconductor switching elements, the driving current to be supplied from phase output,
wherein a first semiconductor switching element of the plurality of semiconductor switching elements is disposed between the phase output of the power conversion device and the power source, and a first diode is connected in parallel to the first semiconductor switching element,
a second semiconductor switching element of the plurality of semiconductor switching element is disposed between the phase output of the power conversion device and a ground, and a second diode is connected in parallel to the second semiconductor switching element,
the first diode and the second diode parallel with the second semiconductor switching element are connected in an inverse direction, one of the first and second diodes configured to allow current flow between a winding of the motor and the power source, and the other of the first and second diodes configured to allow current flow between the winding of the motor and the ground,
the phase output includes at least four pieces of phase output,
either (i) each of the at least four pieces of phase output is connected to a motor having at least four phases, or (ii) each of at least three of the at least four pieces of phase output is connected to a motor having at least three phases, and one of the at least four pieces of phase output is connected to a neutral point of the motor including at least three phases.

13. The power conversion device according to claim 12, wherein a third semiconductor switching element in the plurality of semiconductor switching element is disposed in series with the first semiconductor switching element between the power source and the phase output of the power conversion device,
a fourth semiconductor switching element in the plurality of semiconductor switching elements is disposed between phase output of the motor and the phase output of the power conversion device,
the third semiconductor switching element includes a diode configured to allow current to flow towards the motor, and
the fourth semiconductor switching element includes a diode configured to allow current to flow from the motor to the power conversion device.

14. The power conversion device according to claim 13, wherein a booster circuit includes the third semiconductor switching element as a semiconductor switching element, the booster circuit disposed on a side of the power source of the power conversion device.

15. The power conversion device according to claim 12, wherein a voltage of the power source boosted by a booster circuit controls a gate terminal of at least one of the plurality of semiconductor switching elements, and
an alternating signal to be input operates the booster circuit.

16. The power conversion device according to claim 15, further comprising a microprocessor configured to control the first semiconductor switching element and the second semiconductor switching element, and
the microprocessor outputs the alternating signal.

17. The power conversion device according to claim 15, further comprising:
a first microprocessor and a second microprocessor configured to control the first semiconductor switching element and the second semiconductor switching element, respectively; and
a comparator circuit configured to compare output of the first microprocessor and output of the second microprocessor, and configured to output a result of the comparison,
wherein the comparator circuit outputs the alternating signal as the result of the comparison.

* * * * *